(12) United States Patent
Luby et al.

(10) Patent No.: US 9,596,323 B2
(45) Date of Patent: Mar. 14, 2017

(54) TRANSPORT ACCELERATOR IMPLEMENTING CLIENT SIDE TRANSMISSION FUNCTIONALITY

(71) Applicant: QUALCOMM Incorporated, San Diego, CA (US)

(72) Inventors: Michael George Luby, Berkeley, CA (US); Lorenz Christoph Minder, Evanston, IL (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 14/289,499

(22) Filed: May 28, 2014

(65) Prior Publication Data
US 2015/0271302 A1 Sep. 24, 2015

Related U.S. Application Data

(60) Provisional application No. 61/955,014, filed on Mar. 18, 2014.

(51) Int. Cl.
*H04L 29/06* (2006.01)
*H04L 29/08* (2006.01)

(52) U.S. Cl.
CPC .......... *H04L 69/16* (2013.01); *H04L 65/4084* (2013.01); *H04L 65/80* (2013.01); *H04L 67/02* (2013.01); *H04L 69/14* (2013.01)

(58) Field of Classification Search
CPC ..... H04L 69/16; H04L 65/4084; H04L 65/80; H04L 67/02; H04L 69/14
See application file for complete search history.

(56) References Cited

U.S. PATENT DOCUMENTS 7,447,235 B2 11/2008 Luby et al.
7,502,860 B1 3/2009 Champagne
(Continued)

FOREIGN PATENT DOCUMENTS

EP 2615790 A1 7/2013
EP EP 2833640 A1 * 2/2015 ....... H04N 21/23106
(Continued)

OTHER PUBLICATIONS

Kim, J., et al., "Multi-source Multipath HTTP (mHTTP): A Proposal," Dec. 10, 2013, 12 pages, Cornell University Library, Available at http://arxiv.org/abs/1310.2748.
(Continued)

*Primary Examiner* — Uzma Alam
(74) *Attorney, Agent, or Firm* — Norton Rose Fulbright US LLP

(57) ABSTRACT

Transport accelerator (TA) systems and methods for accelerating transmission of content from a user agent (UA) of a user device to a remote recipient are provided according to embodiments of the present disclosure. Embodiments comprise a TA architecture implementing a connection manager (CM) and a request manager (RM). A RM of embodiments subdivides fragments of content provided by the UA into a plurality of content chunks, each fragment may be subdivided into multiple content chunks. The RM of embodiments provides content chunks to a connection manager (CM) of the TA for transmitting the content chunks. The CM of embodiments transmits the content chunks via a plurality of connections established between the CM and the remote recipient.

40 Claims, 10 Drawing Sheets

(56) References Cited

U.S. PATENT DOCUMENTS

| | | | |
|---|---|---|---|
| 8,396,126 | B2 | 3/2013 | Rodriguez et al. |
| 8,612,624 | B2* | 12/2013 | Frueck .............. H04L 29/06027 709/231 |
| 8,750,188 | B2 | 6/2014 | Nicoara et al. |
| 8,838,095 | B2 | 9/2014 | Jouin |
| 9,172,659 | B1* | 10/2015 | Roitshtein ............. H04L 49/106 |
| 2002/0107971 | A1* | 8/2002 | Bailey ................. H04L 12/2602 709/231 |
| 2002/0164024 | A1 | 11/2002 | Arakawa et al. |
| 2005/0273592 | A1* | 12/2005 | Pryor ....................... H04L 9/32 713/150 |
| 2008/0208985 | A1 | 8/2008 | Georgis et al. |
| 2010/0287274 | A1 | 11/2010 | Martinez et al. |
| 2011/0239078 | A1 | 9/2011 | Luby et al. |
| 2012/0057511 | A1 | 3/2012 | Sivakumar et al. |
| 2012/0140621 | A1 | 6/2012 | Wu et al. |
| 2012/0271880 | A1* | 10/2012 | Sachdeva ................ H04L 67/06 709/203 |
| 2012/0272124 | A1 | 10/2012 | Huang |
| 2012/0311174 | A1 | 12/2012 | Bichot et al. |
| 2012/0327779 | A1 | 12/2012 | Gell et al. |
| 2013/0013799 | A1 | 1/2013 | Keum et al. |
| 2013/0028089 | A1 | 1/2013 | Ramakrishnan |
| 2013/0095806 | A1 | 4/2013 | Salkintzis et al. |
| 2013/0132507 | A1 | 5/2013 | Swaminathan et al. |
| 2013/0166982 | A1 | 6/2013 | Zheng et al. |
| 2013/0191511 | A1 | 7/2013 | Liu et al. |
| 2013/0227080 | A1 | 8/2013 | Gao et al. |
| 2013/0227102 | A1 | 8/2013 | Beck et al. |
| 2013/0227122 | A1 | 8/2013 | Gao et al. |
| 2013/0246643 | A1 | 9/2013 | Luby et al. |
| 2013/0254631 | A1 | 9/2013 | Luby et al. |
| 2013/0304847 | A1 | 11/2013 | Ewanchuk et al. |
| 2013/0311614 | A1* | 11/2013 | Salkintzis ........... H04W 76/025 709/219 |
| 2013/0339543 | A1 | 12/2013 | Fall |
| 2014/0323178 | A1 | 10/2014 | Wei et al. |
| 2014/0325024 | A1* | 10/2014 | Lyle .................. H04L 29/08027 709/219 |
| 2014/0330887 | A1* | 11/2014 | Gilberton .............. H04L 47/196 709/202 |
| 2015/0127775 | A1* | 5/2015 | Munagala ............. H04L 65/601 709/219 |
| 2015/0172352 | A1* | 6/2015 | Gopalakrishnan .... H04L 65/608 709/219 |

FOREIGN PATENT DOCUMENTS

| | | | | | |
|---|---|---|---|---|---|
| FR | WO 2011101371 | A1* | 8/2011 | ....... | H04N 21/44209 |
| FR | EP 2615790 | A1* | 7/2013 | ......... | H04L 65/4084 |
| GB | EP 2833640 | A1* | 2/2015 | ......... | H04N 21/23106 |
| TN | WO 2013030096 | A1* | 3/2013 | ......... | H04N 21/2343 |
| WO | WO-2011038034 | A1 | 3/2011 | | |
| WO | WO-2013030096 | | 3/2013 | | |
| WO | WO 2013030096 | A1* | 3/2013 | ......... | H04N 21/2343 |
| WO | WO-2013067219 | A2 | 5/2013 | | |
| WO | WO-2013130473 | A1 | 9/2013 | | |

OTHER PUBLICATIONS

Seth A., et al., "A Policy-Oriented Architecture for Opportunistic Communication on Multiple Wireless Networks," IEEE Transactions on Mobile Computing, Aug. 2006, pp. 1-15.

Allman M., et al., "IETF RFC 2581 TCP Congestion Control", Internet Citation, Apr. 1999 (Apr. 1999), 14 Pages, XP002210779, Retrieved from the Internet: URL: http://ietf.org/rfc/rfc2581.txt?number=2581 [retrieved on Aug. 22, 2002] p. 2, paragraph 3.1-p. 4, line END.

International Search Report and Written Opinion—PCT/US2015/020554—ISA/EPO—Sep. 21, 2015.

Raiciu C., et al., "Coupled Multipath-Aware Congestion Control; draft-ietf-mptcp-congestion-00.txt", Coupled Multi Path-Aware Congestion Control; Draft-IETF-MPTCP-Congestion-00.TXT, Internet Engineering Task Force, IEFT; StandardWorkingDraft, Internet Society (ISOC) 4, Rue Des Falaises CH—1205 Geneva, Switzerland, Jul. 13, 2010 (Jul. 13, 2010), pp. 1-11, XP015070148, [retrieved on Jul. 13, 2010] p. 4, paragraph 2-p. 9, paragraph 4.1.

Rojviboonchai K., et al., "An Evaluation of Multi-path Transmission Control Protocol (M/TCP) with Robust Acknowledgement Schemes", IEICE Trans Commun, 2004, pp. 2699-2707, vol. E87-B; No. 9.

Scharf M., et al., "Multi-Connection TCP (MCTCP) Transport; draft-scharf-mptcp-mctcp-01.txt", Multi-Connection TCP (MCTCP) Transport; Draft-Scharf-MPTCP-MCTCP-01.TXT, Internt Engineering Task Force, IETF; StandardWorkingDraft, Internet Society (ISOC) 4, Rue Des Falaises CH—1205 Geneva, Switzerland, No. 1, Jul. 12, 2010 (Jul. 12, 2010), pp. 1-35, XP015070105, [retrieved on Jul. 12, 2010] the whole document.

Yavuz D., et al., "Highly Survivable Communications: Complementary Packet switched Networks", AGARD Conference Proceedings, Neuilly Surseine, FR, No. 543, Oct. 4, 1993 (Oct. 4, 1993), pp. 1-14, XP002187632, ISSN: 0549-7191, pp. 1-4, paragraph 4.3-pp. 1-5, right-hand column, line 9.

Partial International Search Report—PCT/US2015/020554—ISA/EPO—Jun. 19, 2015.

Detti A., et al., "Supporting Mobile Applications with Information Centric Networking: the Case of P2P Live Adaptive Video Streaming," Proceedings of the 3rd ACM SIGCOMM workshop on Information-centric networking, 2013, pp. 35-36.

Kaspar D., et al., "Using HTTP Pipelining to Improve Progressive Download over Multiple Heterogeneous Interfaces," IEEE International Conference on Communications (ICC), 2010, 5 pages.

* cited by examiner

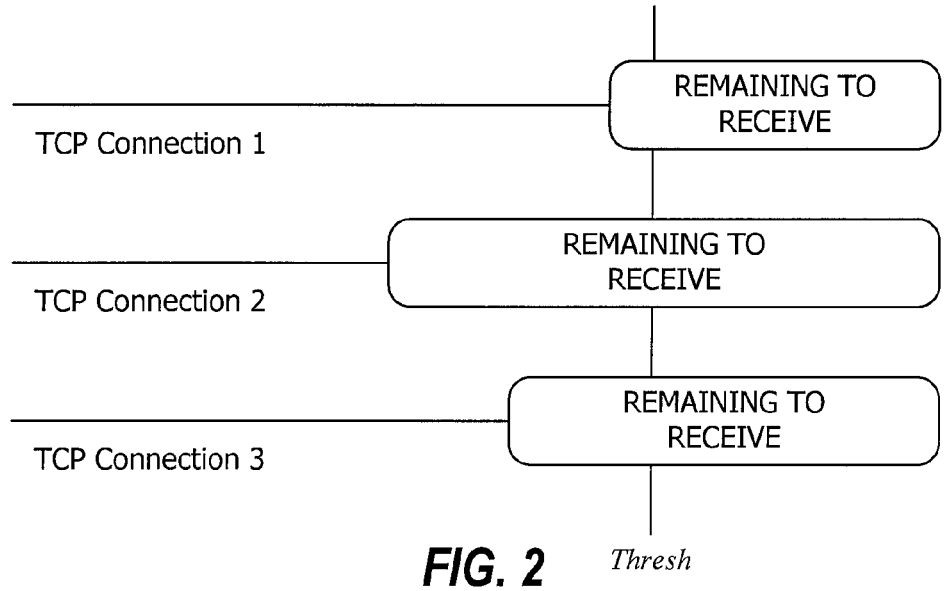
FIG. 2  Thresh
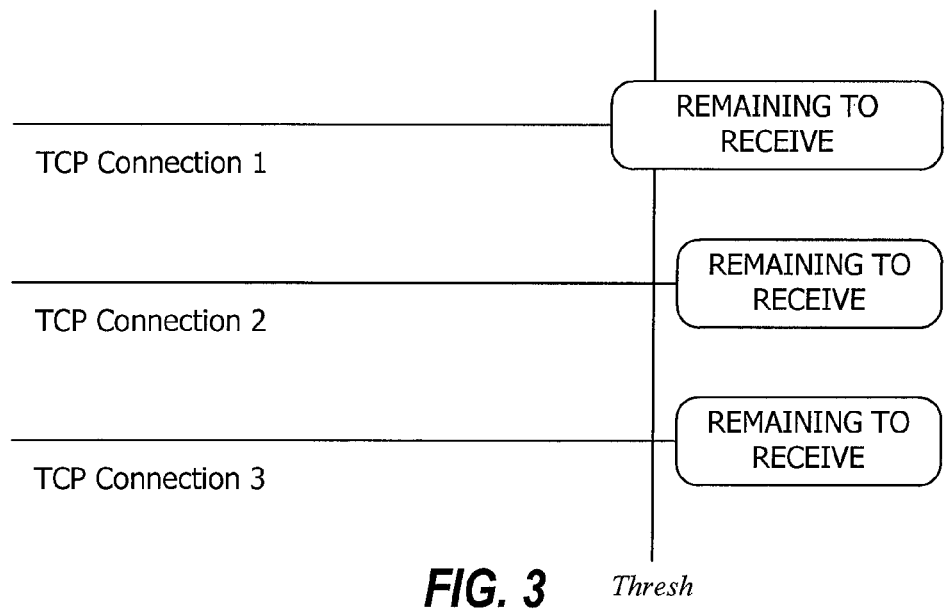
FIG. 3  Thresh

TRANSPORT ACCELERATOR IMPLEMENTING CLIENT SIDE TRANSMISSION FUNCTIONALITY

PRIORITY AND RELATED APPLICATIONS STATEMENT

The present application claims priority to U.S. Provisional Patent Application No. 61/955,014, entitled "TRANSPORT ACCELERATOR IMPLEMENTING CLIENT SIDE TRANSMISSION FUNCTIONALITY," filed Mar. 18, 2014, the disclosure of which is hereby incorporated herein by reference. This application is related to commonly assigned U.S. patent application Ser. No. 14/289,016, entitled "TRANSPORT ACCELERATOR IMPLEMENTING EXTENDED TRANSMISSION CONTROL FUNCTIONALITY," filed May 28, 2014, Ser. No. 14/289,181, entitled "TRANSPORT ACCELERATOR IMPLEMENTING EXTENDED TRANSMISSION CONTROL FUNCTIONALITY," filed May 28, 2014, Ser. No. 14/289,348, entitled "TRANSPORT ACCELERATOR IMPLEMENTING ENHANCED SIGNALING," filed May 28, 2014, Ser. No. 14/289,403, entitled "TRANSPORT ACCELERATOR IMPLEMENTING REQUEST MANAGER AND CONNECTION MANAGER FUNCTIONALITY," filed May 28, 2014 Ser. No. 14/289,458, "TRANSPORT ACCELERATOR IMPLEMENTING SELECTIVE UTILIZATION OF REDUNDANT ENCODED CONTENT DATA FUNCTIONALITY," filed May 28, 2014, and issued as U.S. Pat. No. 9,350,484 on May 24, 2016, and Ser. No. 14/289,476, entitled "TRANSPORT ACCELERATOR IMPLEMENTING A MULTIPLE INTERFACE ARCHITECTURE," filed May 28, 2014, each of which being concurrently filed herewith and the disclosures of which are expressly incorporated by reference herein in their entirety.

DESCRIPTION OF THE RELATED ART

More and more content is being transferred over available communication networks. Often, this content includes numerous types of data including, for example, audio data, video data, image data, etc. Video content, particularly high resolution video content, often comprises a relatively large data file or other collection of data. Accordingly, a user agent (UA) on an end user device or other client device which is consuming such content often requests and receives a sequence of fragments of content comprising the desired video content. For example, a UA may comprise a client application or process executing on a user device that requests data, often multimedia data, and receives the requested data for further processing and possibly for display on the user device.

Many types of applications today rely on HTTP for the foregoing content delivery. In many such applications the performance of the HTTP transport is critical to the user's experience with the application. For example, live streaming has several constraints that can hinder the performance of a video streaming client. Two constraints stand out particularly. First, media segments become available one after another over time. This constraint prevents the client from continuously downloading a large portion of data, which in turn affects the accuracy of download rate estimate. Since most streaming clients operate on a "request-download-estimate", loop, it generally does not do well when the download estimate is inaccurate. Second, when viewing a live event streaming, users generally don't want to suffer a long delay from the actual live event timeline. Such a behavior prevents the streaming client from building up a large buffer, which in turn may cause more rebuffering.

The content transfer techniques in common use today are generally adapted for content being provided from a server system or similar origin device for consumption by user equipment (UE) operating as a client device. Accordingly, the transport techniques are typically not well suited for a situation in which a UE is generating and transmitting a content stream (e.g., in the case of a live blog or other media broadcast session) rather than consuming a content stream.

SUMMARY

A method for accelerating, by a transport accelerator (TA) of a user device, transmission of content from a user agent (UA) of the user device to a remote recipient is provided according to embodiments of the present disclosure. The method according to embodiments includes a request manager (RM) of the TA subdividing fragments of content provided by the UA into a plurality of content chunks, each fragment subdivided into multiple content chunks, and providing the plurality of content chunks to a connection manager (CM) of the TA for transmitting the plurality of content chunks. The method of embodiments further includes the CM transmitting the plurality of content chunks via a plurality of connections established between the CM and the remote recipient.

An apparatus for accelerating, by a transport accelerator (TA) of a user device, transmission of content from a user agent (UA) of the user device to a remote recipient is provided according to embodiments of the present disclosure. The apparatus according to embodiments includes means for a request manager (RM) of the TA subdividing fragments of content provided by the UA into a plurality of content chunks, each fragment subdivided into multiple content chunks, and for providing the plurality of content chunks to a connection manager (CM) of the TA for transmitting the plurality of content chunks. The apparatus of embodiments further includes means for the CM transmitting the plurality of content chunks via a plurality of connections established between the CM and the remote recipient.

A computer program product for accelerating, by a transport accelerator (TA) of a user device, transmission of content from a user agent (UA) of the user device to a remote recipient is provided according to embodiments of the present disclosure. The computer program product according to embodiments includes a non-transitory computer-readable medium having program code recorded thereon. The program code of embodiments includes code to subdivide, by a request manager (RM) of the TA, fragments of content provided by the UA into a plurality of content chunks, each fragment subdivided into multiple content chunks, and code to provide, by the RM to a connection manager (CM) of the TA, the plurality of content chunks for transmitting the plurality of content chunks. The program code of embodiments further includes code to transmit, by the CM, the plurality of content chunks via a plurality of connections established between the CM and the remote recipient.

An apparatus configured for accelerating, by a transport accelerator (TA) of a user device, transmission of content from a user agent (UA) of the user device to a remote recipient is provided according to embodiments of the present disclosure. The apparatus of embodiments includes at least one processor and a memory coupled to the at least one processor. The at least one processor is configured according to embodiments to subdivide, by a request manager (RM) of the TA, fragments of content provided by the UA into a plurality of content chunks, each fragment subdivided into multiple content chunks, and to provide, by the RM to a connection manager (CM) of the TA, the plurality of content chunks for transmitting the plurality of content content chunks. The at least one processor is further configured according to embodiments to transmit, by the CM, the plurality of content chunks via a plurality of connections established between the CM and the remote recipient.

BRIEF DESCRIPTION OF THE DRAWINGS

FIG. 2 shows an exemplary embodiment of a Connection Manager employing a threshold parameter for determining when another chunk of data can be requested on a connection.

FIG. 3 shows an exemplary embodiment of a Connection Manager employing a threshold parameter for determining when the Connection Manager is currently able to immediately make a chunk request.

DETAILED DESCRIPTION

Figure 1A:
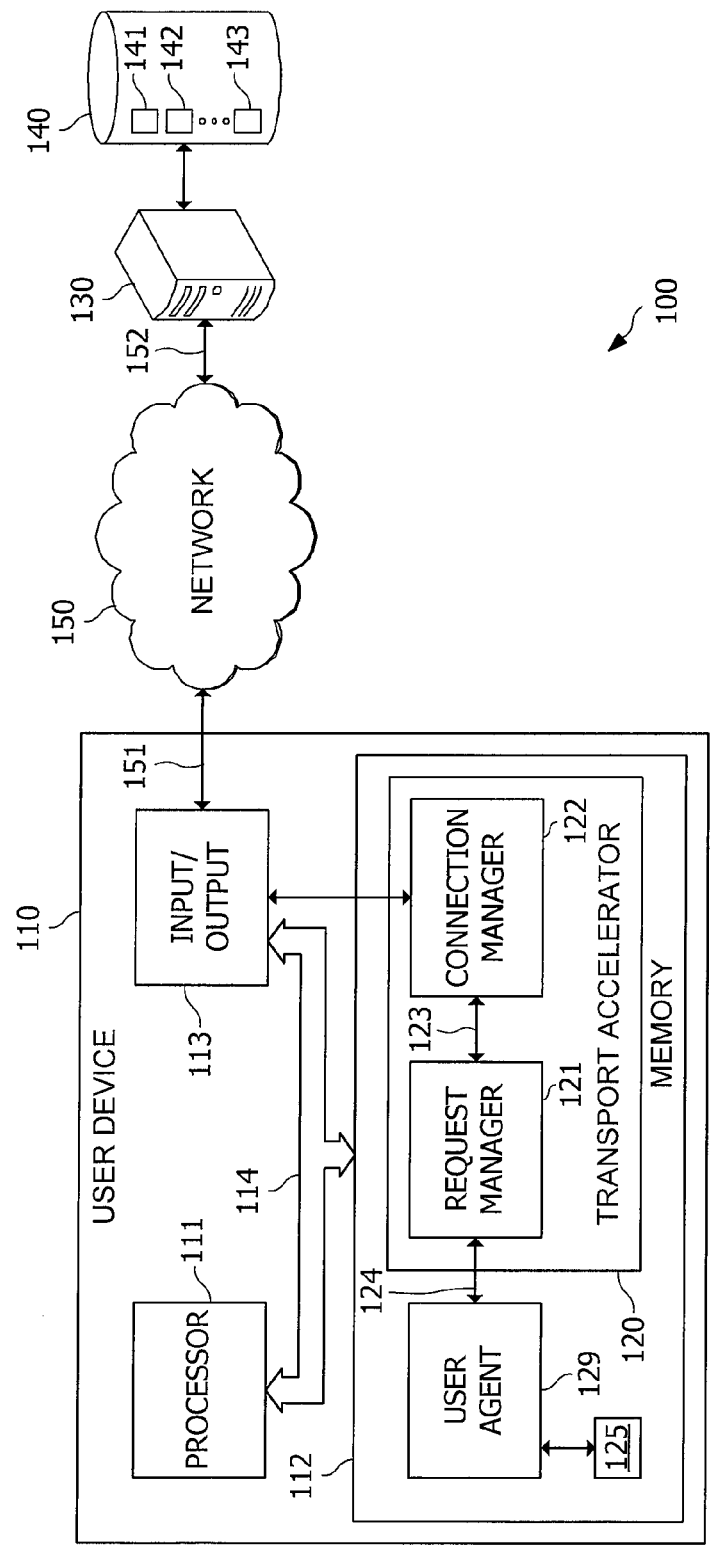
FIG. 1A shows system adapted for transport acceleration operation according to embodiments of the present disclosure.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the term "content" may include data having video, audio, combinations of video and audio, or other data at one or more quality levels, the quality level determined by bit rate, resolution, or other factors. The content may also include executable content, such as: object code, scripts, byte code, markup language files, and patches. In addition, "content" may also include files that are not executable in nature, such as documents that may need to be opened or other data files that need to be accessed.

As used in this description, the term "fragment" refers to one or more portions of content that may be requested by and/or received at a user device.

As used in this description, the term "streaming content" refers to content that may be sent from a server device and received at a user device according to one or more standards that enable the real-time transfer of content or transfer of content over a period of time. Examples of streaming content standards include those that support de-interleaved (or multiple) channels and those that do not support de-interleaved (or multiple) channels.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

As used herein, the terms "user equipment," "user device," and "client device" include devices capable of requesting and receiving content from a web server and transmitting information to a web server. Such devices can be a stationary devices or mobile devices. The terms "user equipment," "user device," and "client device" can be used interchangeably.

As used herein, the term "user" refers to an individual receiving content on a user device or on a client device and transmitting information to a website.

FIG. 1A shows system 100 adapted according to the concepts herein to provide transfer of content, such as may comprise audio data, video data, image data, file data, etc., over communication networks. Accordingly, user device 110 is shown in communication with server 130 via network 150, whereby server 130 may transfer various content stored in database 140 to user device 110 in accordance with the concepts of the present disclosure. It should be appreciated that, although only a single user device and a single server and database are represented in FIG. 1A, system 100 may comprise a plurality of any or all such devices. For example, server 130 may comprise a server of a server farm, wherein a plurality of servers may be disposed centrally and/or in a distributed configuration, to serve high levels of demand for content transfer. Alternatively, server 130 may be collocated on the same device as transport accelerator 120 (e.g., connected to transport accelerator 120 directly through I/O element 113, instead of through network 150) such as when some or all of the content resides in a database 140 (cache) that is also collocated on the device and provided to transport accelerator 120 through server 130. Likewise, users may possess a plurality of user devices and/or a plurality of users may each possess one or more user devices, any or all of which are adapted for content transfer according to the concepts herein.

User device 110 may comprise various configurations of devices operable to receive transfer of content via network 150. For example, user device 110 may comprise a wired device, a wireless device, a personal computing device, a tablet or pad computing device, a portable cellular telephone, a WiFi enabled device, a Bluetooth enabled device, a television, a pair of glasses having a display, a pair of augmented reality glasses, or any other communication, computing or interface device connected to network 150 which can communicate with server 130 using any available methodology or infrastructure. User device 110 is referred to as a "client device" because it can function as, or be connected to, a device that functions as a client of server 130.

User device 110 of the illustrated embodiment comprises a plurality of functional blocks, shown here as including processor 111, memory 112, and input/output (I/O) element 113. Although not shown in the representation in FIG. 1A for simplicity, user device 110 may comprise additional functional blocks, such as a user interface, a radio frequency (RF) module, a camera, a sensor array, a display, a video player, a browser, etc., some or all of which may be utilized by operation in accordance with the concepts herein. The foregoing functional blocks may be operatively connected over one or more buses, such as bus 114. Bus 114 may comprises the logical and physical connections to allow the connected elements, modules, and components to communicate and interoperate.

Memory 112 can be any type of volatile or non-volatile memory, and in an embodiment, can include flash memory. Memory 112 can be permanently installed in user device 110, or can be a removable memory element, such as a removable memory card. Although shown as a single element, memory 112 may comprise multiple discrete memories and/or memory types.

Memory 112 may store or otherwise include various computer readable code segments, such as may form applications, operating systems, files, electronic documents, content, etc. For example, memory 112 of the illustrated embodiment comprises computer readable code segments defining Transport Accelerator (TA) 120 and UA 129, which when executed by a processor (e.g., processor 111) provide logic circuits operable as described herein. The code segments stored by memory 112 may provide applications in addition to the aforementioned TA 120 and UA 129. For example, memory 112 may store applications such as a browser, useful in accessing content from server 130 according to embodiments herein. Such a browser can be a web browser, such as a hypertext transfer protocol (HTTP) web browser for accessing and viewing web content and for communicating via HTTP with server 130 over connections 151 and 152, via network 150, if server 130 is a web server. As an example, an HTTP request can be sent from the browser in user device 110, over connections 151 and 152, via network 150, to server 130. A HTTP response can be sent from server 130, over connections 152 and 151, via network 150, to the browser in user device 110.

UA 129 is operable to request and/or receive content from a server, such as server 130. UA 129 may, for example, comprise a client application or process, such as a browser, a DASH client, a HTTP Live Streaming (HLS) client, etc., that requests data, such as multimedia data, and receives the requested data for further processing and possibly for display on a display of user device 110. For example, user device 110 may execute code comprising UA 129 for playing back media, such as a standalone media playback application or a browser-based media player configured to run in an Internet browser. In operation according to embodiments, UA 129 decides which fragments or sequences of fragments of a content file to request for transfer at various points in time during a streaming content session. For example, a DASH client configuration of UA 129 may operate to decide which fragment to request from which representation of the content (e.g., high resolution representation, medium resolution representation, low resolution representation, etc.) at each point in time, such as based on recent download conditions. Likewise, a web browser configuration of UA 129 may operate to make requests for web pages, or portions thereof, etc. Typically, the UA requests such fragments using HTTP requests.

TA 120 is adapted according to the concepts herein to provide enhanced delivery of fragments or sequences of fragments of desired content (e.g., the aforementioned content fragments as may be used in providing video streaming, file download, web-based applications, general web pages, etc.). TA 120 of embodiments is adapted to allow a generic or legacy UA (i.e., a UA which has not been predesigned to interact with the TA) that only supports a standard interface, such as a HTTP 1.1 interface implementing standardized TCP transmission protocols, for making fragment requests to nevertheless benefit from using the TA executing those requests. Additionally or alternatively, TA 120 of embodiments provides an enhanced interface to facilitate providing further benefits to UAs that are designed to take advantage of the functionality of the enhanced interface. TA 120 of embodiments is adapted to execute fragment requests in accordance with existing content transfer protocols, such as using TCP over a HTTP interface implementing standardized TCP transmission protocols, thereby allowing a generic or legacy media server (i.e., a media server which has not been predesigned to interact with the TA) to serve the requests while providing enhanced delivery of fragments to the UA and client device. It should be appreciated that, although UA 129 and TA 120 of the embodiment illustrated if FIG. 1A are shown hosted on a same user device, UA 129 may not be on the same device as TA 120, according to embodiments herein.

In providing the foregoing enhanced fragment delivery functionality, TA 120 of the embodiments herein comprises architectural components and protocols as described herein. For example, TA 120 of the embodiment illustrated in FIG. 1A comprises Request Manager (RM) 121 and Connection Manager (CM) 122 which cooperate to provide various enhanced fragment delivery functionality, as described further below.

In addition to the aforementioned code segments forming applications, operating systems, files, electronic documents, content, etc., memory 112 may include or otherwise provide various registers, buffers, and storage cells used by functional blocks of user device 110. For example, memory 112 may comprise a play-out buffer, such as may provide a first-in/first-out (FIFO) memory for spooling data of fragments for streaming from server 130 and playback by user device 110.

Processor 111 of embodiments can be any general purpose or special purpose processor capable of executing instructions to control the operation and functionality of user device 110. Although shown as a single element, processor 111 may comprise multiple processors, or a distributed processing architecture.

I/O element 113 can include and/or be coupled to various input/output components. For example, I/O element 113 may include and/or be coupled to a display, a speaker, a microphone, a keypad, a pointing device, a touch-sensitive screen, user interface control elements, and any other devices or systems that allow a user to provide input commands and receive outputs from user device 110. Any or all such components may be utilized to provide a user interface of user device 110. Additionally or alternatively, I/O element 113 may include and/or be coupled to a disk controller, a network interface card (NIC), a radio frequency (RF) transceiver, and any other devices or systems that facilitate input and/or output functionality of user device 110.

In operation to access and play streaming content, user device 110 communicates with server 130 via network 150, using links 151 and 152, to obtain content data (e.g., as the aforementioned fragments) which, when rendered, provide playback of the content. Accordingly, UA 129 may comprise a content player application executed by processor 111 to establish a content playback environment in user device 110. When initiating playback of a particular content file, UA 129 may communicate with a content delivery platform of server 130 to obtain a content identifier (e.g., one or more lists, manifests, configuration files, or other identifiers that identify media segments or fragments, and their timing boundaries, of the desired content). The information regarding the media segments and their timing is used by streaming content logic of UA 129 to control requesting fragments for playback of the content.

Server 130 comprises one or more systems operable to serve desired content to client devices. For example, server 130 may comprise a standard HTTP web server operable to stream content to various client devices via network 150. Server 130 may include a content delivery platform comprising any system or methodology that can deliver content to user device 110. The content may be stored in one or more databases in communication with server 130, such as database 140 of the illustrated embodiment. Database 140 may be stored on server 130 or may be stored on one or more servers communicatively coupled to server 130. Content of database 140 may comprise various forms of data, such as video, audio, streaming text, and any other content that can be transferred to user device 110 over a period of time by server 130, such as live webcast content and stored media content.

Database 140 may comprise a plurality of different source or content files and/or a plurality of different representations of any particular content (e.g., high resolution representation, medium resolution representation, low resolution representation, etc.). For example, content file 141 may comprise a high resolution representation, and thus high bit rate representation when transferred, of a particular multimedia compilation while content file 142 may comprise a low resolution representation, and thus low bit rate representation when transferred, of that same particular multimedia compilation. Additionally or alternatively, the different representations of any particular content may comprise a Forward Error Correction (FEC) representation (e.g., a representation including redundant encoding of content data), such as may be provided by content file 143. A Uniform Resource Locator (URL), Uniform Resource Identifier (URI), and/or Uniform Resource Name (URN) is associated with all of these content files according to embodiments herein, and thus such URLs, URIs, and/or URNs may be utilized, perhaps with other information such as byte ranges, for identifying and accessing requested data.

Network 150 can be a wireless network, a wired network, a wide area network (WAN), a local area network (LAN), or any other network suitable for the transfer of content as described herein. In an embodiment, network 150 can comprise at least portions of the Internet. User device 110 can be connected to network 150 over a bi-directional connection, such as is represented by network connection 151.

Alternatively, user device 110 can be connected via a uni-directional connection, such as that provided by a Multimedia Broadcast System (MBMS) enabled network (e.g., connections 151, 152 and network 150 may comprise a MBMS network, and server 130 may comprise a Broadcast Multicast Service Center (BM-SC) server). The connection can be a wired connection or can be a wireless connection. In an embodiment, connection 151 can be a wireless connection, such as a cellular 4G connection, a wireless fidelity (WiFi) connection, a Bluetooth connection, or another wireless connection. Server 130 can be connected to network 150 over a bi-directional connection, such as represented by network connection 152. Server 130 can be connected to network 150 over a uni-directional connection (e.g. a MBMS network using protocols and services as described in 3GPP TS.26.346 or an ATSC 3.0 network). The connection can be a wired connection or can be a wireless connection.

User device 110 of the embodiment illustrated in FIG. 1A comprises TA 120 operable to provide enhanced delivery of fragments or sequences of fragments of desired content according to the concepts herein. As discussed above, TA 120 of the illustrated embodiment comprises RM 121 and CM 122 which cooperate to provide various enhanced fragment delivery functionality. Interface 124 between UA 129 and RM 121 and interface 123 between RM 121 and CM 122 of embodiments provide an HTTP-like connection. For example, the foregoing interfaces may employ standard HTTP protocols as well as including additional signaling (e.g., provided using signaling techniques similar to those of HTTP) to support certain functional aspects of enhanced fragment delivery according to embodiments herein.

In operation according to embodiments RM 121 receives requests for fragments from UA 129 and decides what data to request from CM 122 to reliably receive and recover requested fragments. In accordance with embodiments herein, RM 121 is adapted to receive and respond to fragment requests from a generic or legacy UA (i.e., a UA which has not been predesigned to interact with the RM), thereby providing compatibility with such legacy UAs. Accordingly, RM 121 may operate to isolate UA 129 from the extended transmission protocol operation of TA 120. However, as will be more fully understood from the discussion which follows, UA 129 may be adapted for extended transmission protocol operation, whereby RM 121 and UA 129 cooperate to implement one or more features of the extended transmission protocol operation, such as through the use of signaling between RM 121 and UA 129 for implementing such features.

The size of data requests (referred to herein as "chunk requests" wherein the requested data comprises a "chunk") made by RM 121 to CM 122 of embodiments can be much less than the size of the fragment requested by UA 129, and which fragment RM 121 is recovering. Thus, each fragment request from UA 129 may trigger RM 121 to generate and make multiple chunk requests to CM 122 to recover that fragment.

Some of the chunk requests made by RM 121 to CM 122 may be for data already requested that has not yet arrived, and which RM 121 has deemed may never arrive or may arrive too late. Additionally or alternatively, some of the chunk requests made by RM 121 to CM 122 may be for FEC encoded data generated from the original fragment, whereby RM 121 may FEC decode the data received from CM 122 to recover the fragment, or some portion thereof. RM 121 delivers recovered fragments to UA 129. Accordingly, there may be various configurations of RMs according to embodiments of the invention, such as may comprise a basic RM configuration (RM-basic) which does not use FEC data and thus only requests portions of data from the original source fragments and a FEC RM configuration (RM-FEC) which can request portions of data from the original source fragments as well as matching FEC fragments generated from the source fragments.

RM 121 of embodiments may be unaware of timing and/or bandwidth availability constraints, thereby facilitating a relatively simple interface between RM 121 and CM 122, and thus RM 121 may operate to make chunk requests without consideration of such constraints by RM 121. Alternatively, RM 121 may be adapted for awareness of timing and/or bandwidth availability constraints, such as may be supplied to RM 121 by CM 122 or other modules within user device 110, and thus RM 121 may operate to make chunk requests based upon such constraints.

RM 121 of embodiments is adapted for operation with a plurality of different CM configurations. Moreover, RM 121 of some embodiments may interface concurrently with more than one CM, such as to request data chunks of the same fragment or sequence of fragments from a plurality of CMs. Each such CM may, for example, support a different network interface (e.g., a first CM may have a local interface to an on-device cache, a second CM may use HTTP/TCP connections to a 3G network interface, a third CM may use HTTP/TCP connections to a 4G/LTE network interface, a fourth CM may use HTTP/TCP connections to a WiFi network interface, etc.).

In operation according to embodiments CM 122 interfaces with RM 121 to receive chunk requests, and sends those requests over network 150. CM 122 receives the responses to the chunk requests and passes the responses back to RM 121, wherein the fragments requested by UA 129 are resolved from the received chunks.

Functionality of CM 122 operates to decide when to request data of the chunk requests made by RM 121. In accordance with embodiments herein, CM 122 is adapted to request and receive chunks from generic or legacy servers (i.e., a server which has not been predesigned to interact with the CA). For example, the server(s) from which CM 122 requests the data may comprise standard HTTP web servers. Alternatively, the server(s) from which CM 122 receives the data may comprise BM-SC servers used in MBMS services deployment.

As with RM 121 discussed above, there may be various configurations of CMs according to embodiments of the invention. For example, a multiple connection CM configuration (e.g., CM-mHTTP) may be provided whereby the CM is adapted to use HTTP over multiple TCP connections. A multiple connection CM configuration may operate to dynamically vary the number of connections (e.g., TCP connections), such as depending upon network conditions, demand for data, congestion window, etc. As another example, an extended transmission protocol CM configuration (e.g., CM-xTCP) may be provided wherein the CM uses HTTP on top of an extended form of a TCP connection (referred to herein as xTCP). Such an extended transmission protocol may provide operation adapted to facilitate enhanced delivery of fragments by TA 120 according to the concepts herein. For example, an embodiment of xTCP provides acknowledgments back to the server even when sent packets are lost (in contrast to the duplicate acknowledgement scheme of TCP when packets are lost). Such a xTCP data packet acknowledgment scheme may be utilized by TA 120 to avoid the server reducing the rate at which data packets are transmitted in response to determining that data packets are missing. As still another example, a proprietary protocol CM configuration (e.g., CM-rUDP) wherein the CM uses a proprietary User Datagram Protocol (UDP) protocol and the rate of sending response data from a server may be at a constant preconfigured rate, or there may be rate management within the protocol to ensure that the send rate is as high as possible without undesirably congesting the network. Such a proprietary protocol CM may operate in cooperation with proprietary servers that support the proprietary protocol.

Further, in accordance with embodiments, user device 110 may be able to connect to one or more other devices (e.g., various configurations of devices disposed nearby), referred to herein as helper devices (e.g., over a WiFi or Bluetooth interface), wherein such helper devices may have connectivity to one or more servers, such as server 130, through a 3G or LTE connection, potentially through different carriers for the different helper devices. Thus, user device 110 may be able to use the connectivity of the helper devices to send chunk requests to one or more servers, such as server 130. In this case, there may be a CM within TA 120 to connect to and send chunk requests and receive responses to each of the helper devices. In such an embodiment, the helper devices may send different chunk request for the same fragment to the same or different servers (e.g., the same fragment may be available to the helper devices on multiple servers, where for example the different servers are provided by the same of different content delivery network providers).

Figure 1B:
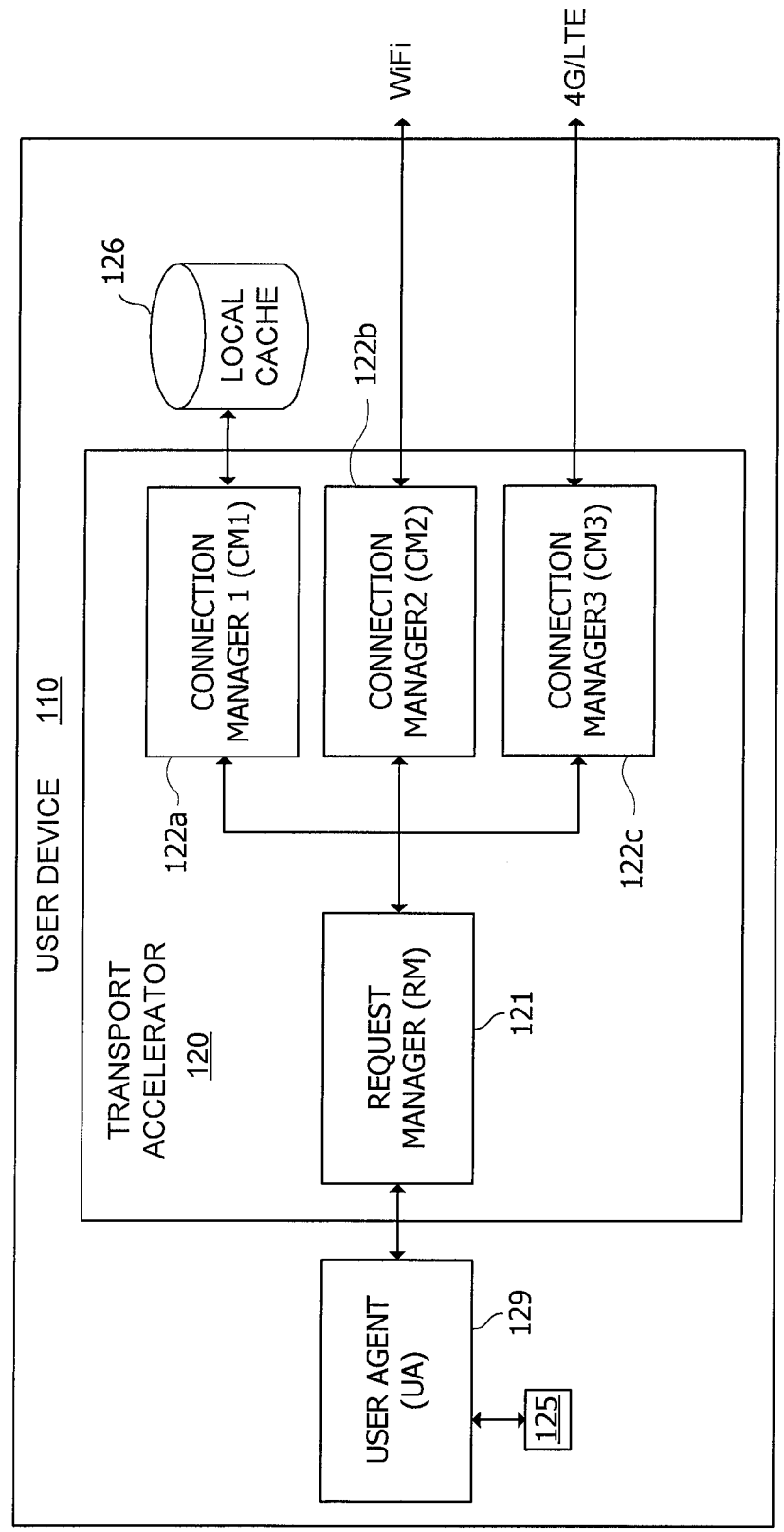
FIG. 1B shows a configuration in which a Request Manager is interfaced with a plurality of Connection Managers according to embodiments of the present disclosure.

Although a single instance of CM 122 is shown in the embodiment illustrated in FIG. 1A, a plurality of such CMs may be utilized in accordance with embodiments herein. For example, RM 121 of some embodiments may interface with more than one such CM, as shown in the embodiment of FIG. 1B. Such CMs may, for example, support a different network interface (e.g., CM 122a may have a local interface to on-device cache 126, CM 122b may use HTTP/TCP connections to a WiFi network interface, and CM 122c may use HTTP/TCP connections to a 4G/LTE network interface, etc.). Additionally or alternatively, such CMs may provide network interfaces which are similar in nature (e.g. different WiFi links). RM 121 may thus interface concurrently with the multiple CMs, whereby RM 121 may, for example, be operable to request data chunks of the same fragment or sequence of fragments from a plurality of CMs.

As discussed above, a multiple connection CM configuration (e.g., CM-mHTTP) may be provided whereby the CM is adapted to use multiple connections for requesting and receiving content from one or more content servers according to the concepts herein. Where multiple connections are in use, a fairness aspect arises regarding how the CM enforces the different connections to be fair with one another (e.g., to ensure that the download rates of the connections stay reasonably close to one another, such as within a factor of two).

A relatively simple technique for providing a level of fairness with respect to multiple connections comprises an implementation in which the CM controls the receive window size of each of the connections. For example, CM 122 may set the receive window size of all TCP connections to be equal and to be large enough so that the available bandwidth can be approximately fully utilized by the TCP connections but not so large that some TCP connections at times download at a much faster rate than other TCP connections. Such an implementation may achieve approximately equal download rates for each such TCP connection.

An alternative technique for providing fairness with respect to multiple connections, which avoids controlling the receive window size, comprises an implementation adapted to control the amount of data requested but not yet delivered over each connection. An objectives of this technique is to increase the aggregate download rate of the connections, to ensure that the connections are downloading at approximately the same rate, and to reduce the amount of data buffered in the network. Embodiments implementing this technique utilize one or more threshold parameters to decide when another chunk of data is to be requested on a particular connection of the multiple connections. The same value for the foregoing threshold parameter may be utilized with respect to each connection of the multiple connections according to embodiments. Alternative embodiments may utilize a different value with respect to one or more connections for the foregoing threshold parameter, if desired.

In accordance with embodiments of a connection fairness implementation that controls the amount of data requested but not yet delivered over each connection a threshold parameter, Thresh, is defined to be a number of octets, whose value the CM controls, and is used to decide when another chunk of data can be requested on a connection. For example, when the amount of requested but not yet received data on a TCP connection is below Thresh then another data chunk request can be made on that connection. However, if the amount of requested but not yet received data on a TCP connection is at or above Thresh then another data chunk request is not made on that TCP connection.

FIG. 2 illustrates operation according to an embodiment employing the threshold parameter, Thresh, for deciding when another chunk of data can be requested on a connection. In the illustrated example, it is assumed that the CM is ready for another chunk request on any particular connection when the amount of data left to receive for all current requests falls below Thresh. For example, CM 122 may comprise the aforementioned CM-mHTTP configuration and may be utilizing the three TCP connections as shown in FIG. 2, wherein the CM has already made HTTP chunk requests for data on all three connections such that the amount of remaining data to be received on each of the three TCP connections is still above the threshold amount, Thresh. In this scenario, the CM cannot currently make any more HTTP requests on any of these three connections. Accordingly, the CM is not ready for another chunk request from the RM, because even if the CM did receive another chunk request from the RM the CM could not immediately make a request for that chunk.

FIG. 3 illustrates operation according to an embodiment employing the threshold parameter, Thresh, to decide when the CM is currently able to immediately make a chunk request. In this example it is again assumed that CM 122 is ready for another chunk request on any particular connection when the amount of data left to receive for all current requests falls below a threshold amount, Thresh. In the example of FIG. 3, enough data has been received for at least one of the connections (e.g., TCP connection 2 and TCP connection 3) such that another request can be made.

An objective for the selection of a value of the threshold parameter, Thresh, is that the value be selected to be large enough that the aggregate download rate of the connections is approximately the maximum download rate possible given current network conditions, while at the same time being as small as possible so as to ensure that the different connections are downloading data at approximately the same rate and so that the amount of data buffered in the network is as small as possible. The value of Thresh can be determined dynamically based on the methods described herein when HTTP pipelining is used on individual TCP connections. Selecting a chunk size, C, to be as small as possible facilitates the foregoing. However, as previously discussed the chunk size should be large enough so that the overhead of requesting chunks is a small fraction of the download bandwidth used for receiving the chunk responses. For example, if C is set to 8 KB and HTTP requests are 200 bytes in size, then the relative overhead of chunk requests for this value of C is around 2.5%. This is a reasonable trade-off, given that the TCP acknowledgement traffic is typically a few percent of the TCP download traffic.

It should be appreciated that when pipelining is not implemented, although direct use of the foregoing threshold parameter as described above becomes problematic, threshold based algorithms may nevertheless be implemented for providing connection fairness herein. For example, where a fixed number N of TCP connections is being used, if each chunk request is of size Thresh, the total amount of outstanding bytes on the network will be at most N*Thresh. Thus, if the bandwidth-delay-product of the link to the server is large, a large value of Thresh may be desirable, whereas a small value of Thresh may be preferable if the bandwidth delay product is not large. It should be appreciated that, in such an implementation, the tradeoffs are generally the same as in the above described pipelined case (i.e., the value of the threshold parameter, Thresh, should be large enough to allow receiving data at rate close to the maximum possible, while kept small enough to avoid unnecessary buffering on the network). Compared to the pipelined case, however, the value of the threshold parameter, Thresh, in this non-pipelined example should be smaller by a factor of about N/2 to N.

Having generally described the use of threshold parameters for implementing fairness with respect to a plurality of connections utilized by a Transport Accelerator of embodiments herein, detail with respect to computing appropriate values of such threshold parameters is provided below. It should be understood that the techniques set forth below compute values of a threshold parameter, Thresh, in an iterative way, and may be applied to the pipelined, and non-pipelined cases.

In operation according to embodiments, CM 122 dynamically and continually adjusts the value of Thresh based on current network conditions, because an optimum value for Thresh can vary according to network conditions. A plurality of download rate parameters (e.g., DR, DFR, and DCR) may be utilized in implementing a technique for determining the value of Thresh according to embodiments herein. Such download rate parameters provide a measure of how fast data, fragments of data, and/or chunks of data are being downloaded from the server to the client and may be determined by how many bytes have been received in a window of time. For example, DR (Download Rate) is defined as the aggregate average download rate (e.g., measured over a suitable window of time, or averaged using a weighted moving average) of the connections (e.g., TCP connections). DFR (Download Fragment Rate) is similarly defined as the aggregate average download rate of the connections, except that in the case of DFR the first packet of each fragment, and the time between reception of the first packet of a fragment and the reception of the preceding packet (from any fragment, over any of the TCP connections), is not included in the average (i.e., "discounted"). Likewise, DCR (Download Chunk Rate) is defined as the aggregate average download rate of the connections, except that in the case of DCR the first packet of each chunk, and the time between reception of the first packet of a chunk and the reception of the preceding packet (from any chunk, over any of the TCP connections), is not included in the average (i.e., "discounted").

DCR is typically going to be relatively high (i.e., higher than if the download rate were to be averaged over the entire window of time, including the bytes of the first packet chunks and including the time between the first packet and previous packet) and in some sense it can represent the true available bandwidth over the interface, depending on, as examples, network conditions, the number of TCP connections used, and other factors. Generally, it will be the case that DCR is at least DFR, although this may not always be the case and sometimes DFR can be larger than DCR. In general, an objective of the DCR calculation is to give a value that is indicative of how to control pipelining of the data without requiring explicit feedback from the server or other external network element.

The threshold parameter, Thresh, may be determined and/or adjusted using such download rate parameters, such as in accordance with the following:

If DCR>DFR*1.05 then increase the value of Thresh
Else if DCR<=DFR*1.05 then decrease the value of Thresh Wherein the increase/decrease value of Thresh may be a predetermined value (e.g., 2 KB), may depend on the relative ratio of DCR to DFR, etc.

Such techniques for determining the threshold parameter, Thresh, may be employed from time to time. For example, the value of Thresh may be adjusted after a predetermined period of time (e.g., every 2 seconds), upon the occurrence of an event (e.g., after a number of RTTs, such as 10, or each time a chunk request is received by the CM), etc.

Embodiments may additionally or alternatively operate to dynamically measure one or more of the download rate parameters and determine/adjust the threshold parameter accordingly. For example, after determining/adjusting Thresh, embodiments may measure the DCR and DFR based on the chunks that have been issued after the adjustment of Thresh has occurred. Thereafter, the value for Thresh may be adjusted using these updated download rate parameters. The foregoing dynamically updated measurements of DCR and DFR may, for example, be based on a fixed number T of chunk requests issued. Such a technique has the advantage that the period of measurement of DFR and DCR does depend on the RTT, which is desirable, but does not require measuring the RTT explicitly. Another advantage is that it avoids the possibility that the subsequent adjustment will be made based on measurements of DCR and DFR which happened before Thresh was adjusted the last time, and are thus no longer reflective of current network conditions.

The download rate parameter DPR (Download Pipeline Rate) is another example of a download rate parameter that may be used in addition to or in the alternative to the aforementioned download rate parameters (e.g., DFR and DCR). DPR may, for example, be used as an alternative to using DFR in a Thresh determination above. DPR utilized according to embodiments similar to DFR and DCR, although there are differences as explained in the following.

DPR is defined as the aggregate average download rate of the connections (e.g., TCP connections), except that the calculation of DPR discounts the first packets of chunk requests that are made on connections that have no outstanding data when the request is made. In the calculation of DPR, some first packets of chunks are discounted if the chunk requests are delayed (e.g., no chunk request is made when the RM is notified that the CM is ready for the next chunk request). Thus, DPR is almost the same as the true download rate and, for an initial period of time, there may be no difference between DPR and DCR. For example, the first few chunk requests made on different connections at the very beginning of a session will be classified as not pipelined, as described in further detail below, (and thus the first packets of these chunks will not be counted by DPR or DCR), and similarly the first chunk request(s) for a fragment request in a live scenario may classified as not pipelined if such fragments are only available on a given timeline and the previous fragment are completely downloaded before the next fragment is available. Similarly, chunk requests made for on-demand content immediately after draining the media buffer to the low watermark when using a high-low watermark downloading method may be classified as not pipelined since all TCP connections are not in use when these chunk requests are made.

For embodiments utilizing DPR, the amount of requested but not yet received data for a connection when the next chunk request is made on that connection may be referred to as network buffered data, Buff. The threshold parameter, Thresh, represents the current pipeline threshold for that connection. Accordingly, as discussed above, a new chunk request can be put on the connection when Buff<Thresh.

Assume the CM uses pipelining on all the connections. In operation according to embodiments, the CM may classify a chunk request for a particular connection as "pipelined" (not delayed/on time) for determining DPR if the chunk request is received when Buff>=alpha*Thresh, and the CM may classify a chunk request as "not pipelined" (delayed/not on time) for determining DPR if the chunk request is received when Buff<alpha*Thresh, wherein alpha is a constant <1 (e.g., alpha=½ or alpha=⅔).

Where no pipelining is used the technique for lateness classification of the chunk requests for determining DPR may differ from the foregoing. In a lateness classification technique of embodiments, the number, R, of issued incomplete chunk requests which have already received a partial response at the point in time when the first part of the response for the chunk request in question is returned is computed. If R is larger than a fixed constant, fmin, the CM of embodiments may classify the request as on time, and classify it as delayed otherwise.

Additionally or alternatively, a technique for lateness classification of the chunk requests for determining DPR where no pipelining is used comprises analyzing the idle connections to the content server. For example, at the time the request is issued, logic of CM 122 may count the number of idle TCP connections to server 130. If the number of idle connections exceeds a given threshold (e.g., one-half of the available connections) the request may be classified as delayed. The request may be classified as on time otherwise.

Regardless of the particular technique utilized in classifying requests as pipelined or delayed, DPR may be calculated utilizing the pipelined/delayed classifications. In the calculation of DPR according to embodiments, the first packet of a chunk request is not discounted if the chunk request is classified as pipelined and the first packet of a chunk request is discounted if the chunk request is classified as not pipelined. "Discounted" as used in the foregoing means the bytes received in that first packet are not counted and the time between receiving that first packet and the previous received packet is not counted, whereas "not discounted" means the bytes received in that first packet are counted and the time between receiving that first packet and the previous received packet is counted.

The DPR download rate parameter of embodiments may be calculated as set forth below (it being appreciated that the example below utilizes the aforementioned network buffered data, Buff, and threshold parameter, Thresh, analysis technique in determining "pipelined" (not delayed/on time) and "not pipelined" (delayed or not on time) classifications, whereas other embodiments may utilize alternative techniques, such as those described above, for these classifications):

| Parameter | Meaning |
|---|---|
| Z | The number of bytes downloaded so far (excluding discounted bytes) |
| Tr | The time during which download was active (excluding discounted time) |
| S | Stores a temporary time |
| Tw | The current wall clock time |

A chunk request is made on a TCP connection with Buff octets of requested but not yet received data, where Thresh is the current pipeline threshold in octets for this TCP connection.

If (Buff>=alpha*Thresh) then classify this chunk request as "pipelined"

Else if (Buff<alpha*Thresh) then classify this chunk request as "not pipelined"

Chunks are received on the TCP connection in response to the chunk requests.

Z=0
Tr=0

Each time a packet P is received (of size B bytes, at wall clock time Tw):

If P is the first packet of a chunk that is classified as "not pipelined" then {S=Tw}

```
Else
    {Tr = Tr + (Tw −S);
    Z = Z + B;
    S = Tw
    }
DPR = Z/Tr
```

In operation according to embodiments, DPR may be calculated or averaged over a window of time that is not the entire time of the download. For example, in the case that DPR is to be calculated over the last window of time of duration W seconds, then the numerator Z_W and the denominator Tr_W may be calculated over the last W seconds, whereby DPR=Z_W/Tr_W. One of skill in the art will recognize that similar techniques may be used to calculate other variations of DCR or DPR, such as using an EWMA with a half-life of W.

As examples of calculation of DCR and DPR using an EWMA according to embodiments herein, assume a packet is received that is not to be discounted (is not the first packet of a chunk), the packet contains B bits of data, and the time between the arrival of the packet and the previous packet (of any type) is dt. DCR may be updated as follows:

$$DCR=DCR*\exp(-alpha*dt)$$

$$DCR=TDCR+B/alpha$$

The value of alpha in the foregoing can be chosen, for example, so that the averaging decays over a period of time that is proportional to 1/alpha. The time units of alpha are aligned with the time units of dt of embodiments. For example, if dt is expressed in milliseconds in the foregoing, and the target is a decay of 1/e over a second, then in accordance with an embodiment alpha=1/1000. As another example, if dt is expressed in seconds and the target is a decay of 1/e over a second then alpha=1 in accordance with an embodiment. Carrying the foregoing example embodiments further, for a target decay of 1/e over possibly multiple seconds, e.g., over 5 seconds, if dt is expressed in milliseconds then alpha=1/5000, and if dt is expressed in seconds then alpha=1/5 in accordance with embodiments herein.

The above concepts for calculating DCR using EWMA can be applied to the calculation of DPR using EWMA (discounting first packets of chunks that are not pipelined enough). For example, embodiments for calculating DPR using EWMA may use the same value alpha for both DCR and DPR. Alternative embodiments, however, may use different averaging constants for DCR and DPR (e.g., alphaC for DCR and alphaP for DPR).

Having described techniques for calculating the download rate parameters DCR and DPR, examples of their use in adjusting the threshold value, Thresh, (i.e., the buffer level for a connection below which a new chunk request is made) will be provided below. It should be appreciated that there are many techniques by which the value of Thresh can be obtained using DCR and DPR in accordance with the concepts herein.

As one exemplary example of the use of DCR and DPR for adjusting the value of the threshold parameter, Thresh, let R be the average response time between when HTTP chunk requests are made by the CM and when the first response to the request is received by the CM. For each chunk request, let RTT be the response time between the time when the request is made and when first response is received. Using the foregoing, R=(1−a1)*R+a1*RTT. It can be appreciated that there are many ways to compute R, such as averaging measured RTTs using an EWMA over a window of time or over the number of RTT measurements, by averaging over a fixed previous window of time or over a fixed previous number of RTT measurements, etc.

In utilizing DCR and DPR to adjust Thresh according to embodiments, let Thresh be the total amount of bytes across all the connections that are allocated to the threshold. The value of Thresh can be updated periodically, for example each a2*R seconds, as follows:

If (DCR*a3>DPR) then Thresh=min{Thmax, Th(1+a4)}
Else if (DCR*a5>DPR>=DCR*a3) then Thresh=min (Thmax, Th*(1+a6)}
Elseif (DCR*a5<=DPR) then Thresh=max{Thmin, Th*(1−a7)}

Wherein example values for the constants, a1, a2, a3, a4, a5, a6, and a7, and the threshold minimum and maximums, Thmin and Thmax, are as follows:

a1=0.05
a2=2
a3=0.7
a4=0.5
a5=0.95
a6=0.1
a7=0.05
Thmin=32 KB
Thmax=1 MB

From the foregoing, it can be appreciated that DCR is going to be at least DPR. Where DPR is significantly less than DCR it is an indication that there is a large gap between the first packet of chunks and the previous packet (e.g., the chunk requests are not being made soon enough). Where DCR and DPR are the same or nearly the same value, embodiments may operate to maintain the threshold parameter, Thresh, at its current value or perhaps slowly raise the value.

Embodiments of the invention may implement one or more proxies with respect to the different connections to content servers to facilitate enhanced download of content. For example, embodiments may comprise one or more Transport Accelerator proxies (TA proxies) disposed between one or more User Agents and a content server. Such TA proxy configurations may be provided according to embodiments to facilitate Transport Accelerator functionality with respect to a user device to obtain content via links with content server(s) on behalf of the user device, thereby facilitating delivery of high quality content. For example, existing UAs may establish connections to a TA proxy and send all of their requests for data through the TA and receive all of the replies via the TA to thereby receive the advantages and benefits of TA operation without specifically implementing changes at the UA for such TA operation. Accordingly, a TA proxy may comprise an application that provides a communication interface proxy (e.g., a HTTP proxy) taking requests from a UA (e.g., UA 129), or several UAs for content transfer. The TA proxy may implement an infrastructure including RM and CM functionality, as described above, whereby the requests are sent to one or more RMs, which will then generate chunk requests for one or more corresponding CMs. The TA proxy of embodiments will further collect the chunk responses, and produce a response to the appropriate UA. It should be appreciated that a UA utilizing such a TA proxy may comprise any application that receives data via a protocol supported by the TA proxy (e.g., HTTP), such as a DASH client, a web browser, etc.

Figure 4:
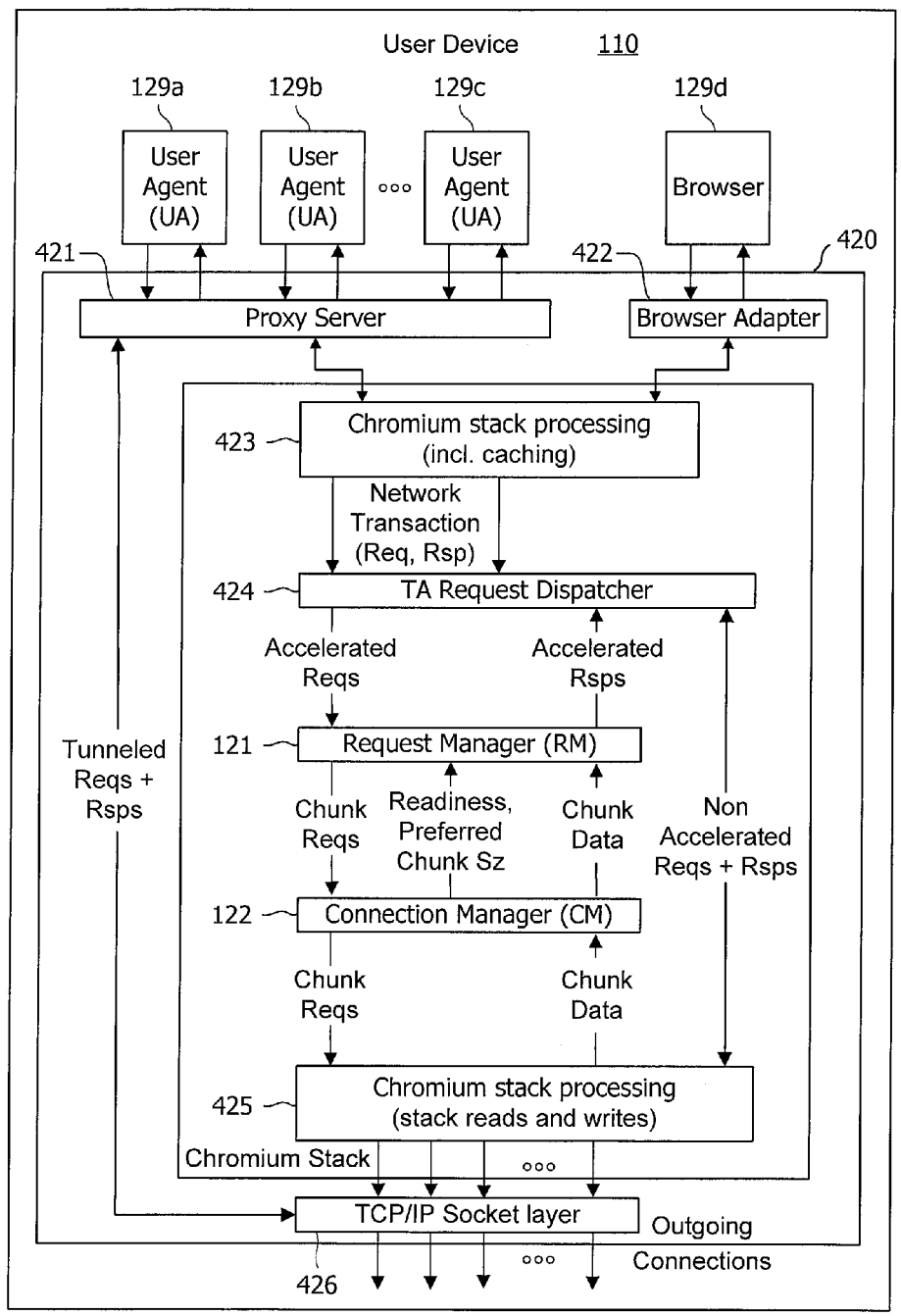
FIG. 4 shows a Transport Accelerator proxy configuration as may be utilized according to embodiments of the present disclosure.

FIG. 4 illustrates an embodiment implementing a Transport Accelerator proxy, shown as TA proxy 420, with respect to user device 110. It should be appreciated that, although TA proxy 420 is illustrated as being deployed within user device 110, TA proxies of embodiments may be deployed in different configurations, such as being hosted (whether wholly or in part) by a device in communication with a user device to which transport accelerator functionality is to be provided.

The illustrated embodiment of TA proxy 420 includes RM 121 and CM 122 operable to generate chunk requests and manage the requests made to one or more servers for desired content, as described above. Moreover, TA proxy 420 of the illustrated embodiment includes additional functionality facilitating proxied transport accelerator operation on behalf of one or more UAs according to the concepts herein. For example, TA proxy 420 is shown to include proxy server 421 providing a proxy server interface with respect to UAs 129a-129c. Although a plurality of UAs are shown in communication with proxy server 421 in order to illustrate support of multiple UA operation, it should be appreciated that embodiments may provide transport accelerator proxied operation with respect to any number of user agents (e.g., one or more).

UAs 129a-129c may interface with TA 420 operable as a proxy to one or more content servers. In operation according to embodiments, proxy server 421 interacts with UAs 129a-129c as if the respective UA is interacting with a content server hosting desired content. The transport accelerator operation, including the chunking of fragment requests, managing requests from the content server(s), assembling fragments from chunks, etc., is provided transparently with respect to UAs 129a-129c. Accordingly, these UAs may comprise various client applications or processes executing on user device 110 which are not specifically adapted for operation with transport accelerator functionality, and nevertheless obtain the benefits of transport accelerator operation.

TA proxy 420 of the illustrated embodiment is also shown to include browser adapter 422 providing a web server interface with respect to UA 129d, wherein UA 129d is shown as a browser type user agent (e.g., a HTTP web browser for accessing and viewing web content and for communicating via HTTP with web servers). Although a single UA is shown in communication with browser adapter 422, it should be appreciated that embodiments may provide transport accelerator proxied operation with respect to any number of user agents (e.g., one or more).

In operation according to embodiments, browser adapter 422 interacts with UA 129d as if the browser is interacting with a web server hosting desired content. As with the proxy server described above, the transport accelerator operation, including the chunking of fragment requests, managing requests from the content server(s), assembling fragments from chunks, etc., is provided transparently with respect to UA 129d. Accordingly, this UA may comprise a browser executing on user device 110 which is not specifically predesigned for operation with transport accelerator functionality, and nevertheless obtains the benefits of transport accelerator operation.

In addition to the aforementioned functional blocks providing a proxy interface with respect to UAs, the embodiment of TA 420 illustrated in FIG. 4 is shown including additional functional blocks useful in facilitating accelerated transport of content according to the concepts herein. In particular, TA 420 is shown as including stack processing 423, TA request dispatcher 424, stack processing 425, and socket layer 426 as may be utilized to provide transport accelerator operation according to embodiments herein.

A TA proxy of embodiments herein operates to schedule requests in such a way to provide fairness with respect to different UAs that may be utilizing the TA proxy. Accordingly, where a TA proxy serves a plurality of UAs, the TA proxy may be adapted to implement request scheduling so as not to stall one UA in favor of others (i.e., the TA proxy attempts to implement fairness with respect to the different UAs). A TA proxy may, for example, schedule requests in a way so to be as fair as possible to the different UAs. A TA proxy serving a plurality of UAs may thus apply logic to be fair among the UAs. For example, a bad user experience would be provided in the situation where there are two DASH client UAs and one client played at a very high rate while the other client stalled completely. Operation where the clients are both sharing the bandwidth available equally or proportionately to their demand may therefore be desirable.

Although the illustrated embodiment of TA proxy 420 is shown adapted for proxied operation with respect to a plurality of different user agent configurations (e.g., general UAs using proxy server 421 and the specific case of browser UAs using browser adapter 422) in order to illustrate the flexibility and adaptability of the transport accelerator platform, it should be appreciated that TA proxies of embodiments may be configured differently. For example, a TA proxy configuration may be provided having only a proxy server or browser adapter, thereby supporting respective UA configurations, according to embodiments.

TA proxies may additionally or alternatively be adapted to operate in accordance with priority information, if such information is available, with respect to requests for one or more UAs being served thereby. Priority information might, for example, be provided in an HTTP header used for this purpose, and a default priority might be assigned otherwise. Furthermore, some applications may have a default value which depends on other meta information on the request, for example the request size and the mime type of the resource requested (e.g., very small requests are frequently meta-data requests, such as requests for the segment index, and it may thus be desirable to prioritize those requests higher than media requests in the setting of a DASH player). As another example, in the case of a web browser application it may be desirable to prioritize HTML files over graphics images, since HTML files are likely to be relatively small and to contain references to further resources that need to be also downloaded, whereas the same is not typically the case for image files.

In operation according to embodiments, for each fragment request, the RM of a TA proxy may issue several chunk requests (possibly including requests for FEC data, as described above). At the point in time where enough response data has been received so that the whole fragment data can be reconstructed, the RM of embodiments reconstructs the fragment data (possibly by FEC decoding). The TA proxy of embodiments may then construct a suitable HTTP response header and send the HTTP response header to the UA, followed by the fragment data.

Additionally or alternatively, a TA proxy may operate to deliver parts of the response earlier; before a complete fragment response can be reconstructed, thereby reducing the latency of the initial response. Since a media player does not necessarily need the complete fragment to commence its play out, such an approach may allow a player to start playing out earlier, and to reduce the probability of a stall. In such operation, however, the TA proxy may want to deliver data back to the UA when not all response headers are known. In an exemplary scenario, a server may respond with a Set-Cookie header (e.g., the server may respond in such a way in every chunk request), but it is undesirable for the TA proxy to wait until every response to every chunk request is seen before sending data to the UA. In operation according to embodiments, the TA proxy may start sending the response using chunked transfer encoding, thereby enabling appending headers at the end of the message. In the particular case of Cookies, the Set-Cookie header would be stripped from the response in the TA proxy at first, and the values stored away, according to embodiments. With each new Set-Cookie header seen, the TA proxy of such an embodiment would update its values of the cookie and, at the end of the transmission (e.g., in the chunked header trailer), the TA proxy would send the final Set-Cookie headers.

Embodiments of a Transport Accelerator architecture herein may be adapted to provide for transmission of content by a user device in addition to or in the alternative to the aforementioned consuming of content by a user device. The Transport Accelerator architecture discussed above may be used in user device content transmission implementations with the change that the content device is the user device (e.g., a Transport Accelerator is provided at the server and the server and user device are operated in reversed roles such that the user device operates as a content source and the server operates as a consumer device). In such embodiments, the consumer device (e.g., server 130) can receive the data by issuing standard HTTP GET requests over one or more connections to the content device (e.g., user device 110). Such an implementation may, however, not be desirable in many situations. In particular, there is generally appreciable resistance to changing web infrastructure such as web servers. Accordingly, it is likely to be considerably easier to deploy Transport Accelerator technology on end user devices. Moreover, when the content device (e.g., user device 110) is a simple consumer device, such as a mobile phone, tablet, or personal computer (PC), then it may be difficult or even impossible for the consumer device (e.g., server 130) to access the content device from the Internet, such as due to firewalls and Network Address Translation (NAT).

Accordingly, embodiments of a user device Transport Accelerator may be adapted to provide for transmission of content in addition to or in the alternative to the aforementioned consuming of content. In accordance with embodiments, it may be more practical and easier to implement the logic for enhanced delivery of fragments or sequences of fragments of desired content provided by operation of a Transport Accelerator implementation into the user device, and assume the consumer device (e.g., server 130 and/or user device 110) is a standard piece of web infrastructure, such as a web server, web client, etc. For example, instead of consuming a content stream, UA 529 of user device 510 of the embodiment shown in FIG. 5 may operate to generate and push out a stream of fragments, or a set of fragments, (e.g., across multiple interfaces and/or to multiple intermediary devices) whereby this user device may not operate as client device as in scenarios described above.

Figure 5:
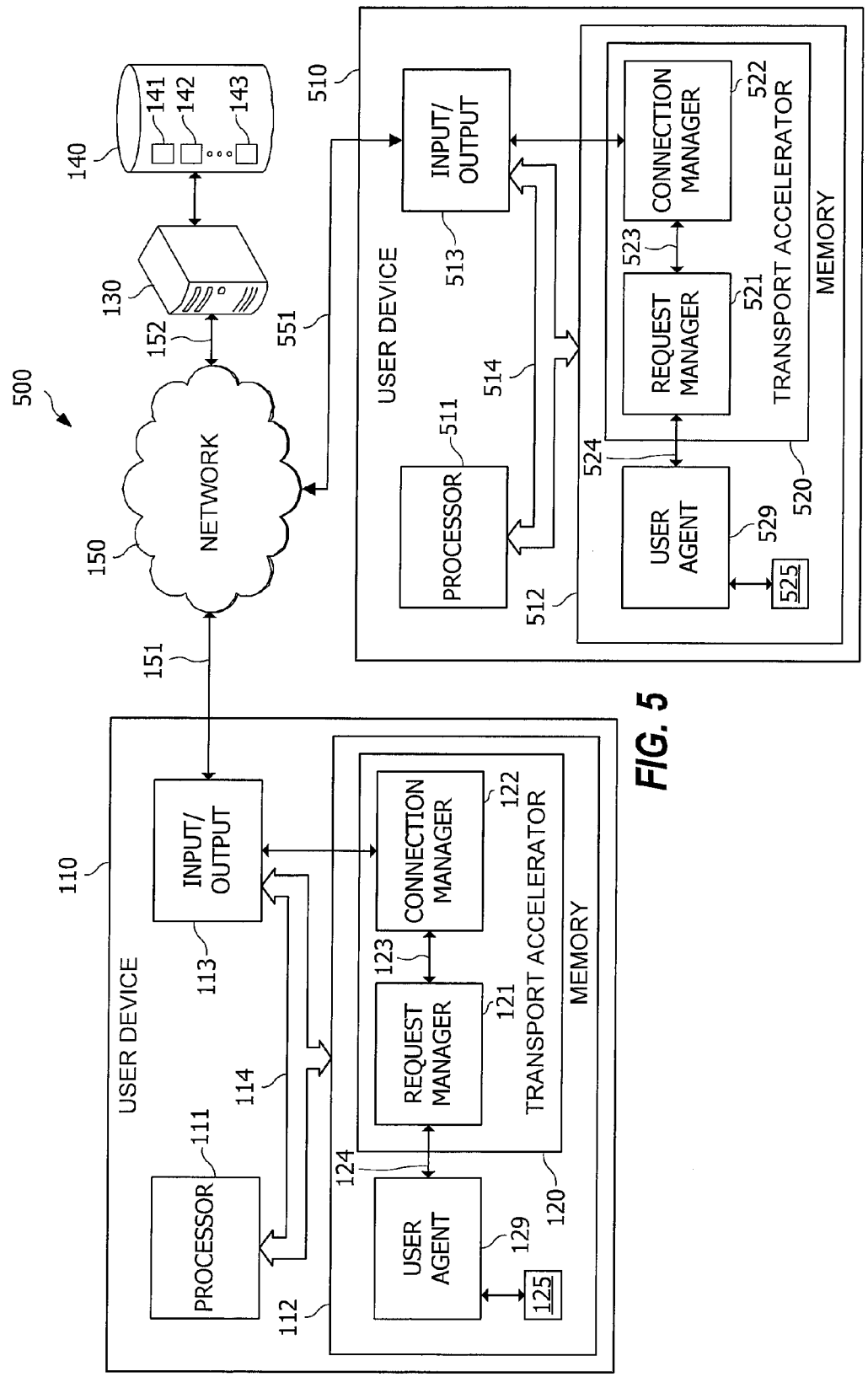
FIG. 5 shows a Transport Accelerator architecture adapted to provide for transmission of content by the user device according to embodiments of the present disclosure.

FIG. 5 shows system 500 having user device 510 including a Transport Accelerator architecture adapted to provide for transmission of content by the user device in addition to or in the alternative to the aforementioned consuming of content by a user device. Accordingly, user device 510 is shown in communication with user device 110 and/or server 130 via network 150, whereby user device 510 may transfer various content (e.g., content file 525 stored in memory 512) to user device 110 and/or server 130 in accordance with the concepts of the present disclosure. It should be appreciated that, although only a single receiving user device and a single receiving server are represented in FIG. 5, system 500 may comprise a plurality of any or all such devices. For example, server 130 may comprise a server of a server farm, wherein a plurality of servers may be disposed centrally and/or in a distributed configuration, to serve high levels of demand for content transfer. Likewise, users may possess a plurality of user devices and/or a plurality of users may each possess one or more user devices, any or all of which are adapted for content transfer according to the concepts herein.

As with user device 110 described above, user device 510 may comprise various configurations of devices operable to receive transfer of content via network 150. For example, user device 510 may comprise a wired device, a wireless device, a personal computing device, a tablet or pad computing device, a portable cellular telephone, a WiFi enabled device, a Bluetooth enabled device, a television, a pair of glasses having a display, a pair of augmented reality glasses, or any other communication, computing or interface device connected to network 150 which can communicate with other devices (e.g., user device 110 and/or server 130) using any available methodology or infrastructure. User device 510 may be referred to as a "client device" because it can function as, or be connected to, a device that functions as a client of server 130, although user device 510 of embodiments herein is operable as a sending source of content.

User device 510 of the illustrated embodiment comprises a plurality of functional blocks, shown here as including processor 511, memory 512, and input/output (I/O) element 513 which are operable according to embodiments as described above with reference to corresponding functional blocks of user device 110. Although not shown in the representation in FIG. 5 for simplicity, user device 510 may comprise additional functional blocks, such as a user interface, a radio frequency (RF) module, a camera, a sensor array, a display, a video player, a browser, etc., some or all of which may be utilized by operation in accordance with the concepts herein. The foregoing functional blocks may be operatively connected over one or more buses, such as bus 514 operable according to embodiments as described above with reference to bus 114 of user device 110.

Memory 512 can be any type of volatile or non-volatile memory, and in an embodiment, can include flash memory. Memory 512 can be permanently installed in user device 510, or can be a removable memory element, such as a removable memory card. Although shown as a single element, memory 512 may comprise multiple discrete memories and/or memory types.

Memory 512 may store or otherwise include various computer readable code segments, such as may form applications, operating systems, files, electronic documents, content, etc. For example, memory 512 of the illustrated embodiment comprises computer readable code segments defining Transport Accelerator (TA) 520 and UA 529, which when executed by a processor (e.g., processor 511) provide logic circuits operable as described herein. The code segments stored by memory 512 may provide applications in addition to the aforementioned TA 520 and UA 529 (e.g., a browser).

UA 529 is operable to provide content for consumption (e.g., playback, storage, execution, etc.) by one or more receiving devices, such as server 130 and/or user device 110. The content may comprise, for example, video, audio, combinations of video and audio, or other data at one or more quality levels. Additionally or alternatively, the content may comprise executable content, such as: object code, scripts, byte code, markup language files, and patches. In addition, the content of embodiments may comprise files that are not executable in nature, such as documents that may need to be opened or other data files that need to be accessed. Accordingly, UA 529 of embodiments may comprise an application or process, such as a browser, a video generating agent, a photo upload application, a user generated streaming application, etc., that transmits data, such as multimedia data, to one or more systems, such as server 130 and/or user device 110. In operation according to embodiments, UA 529 transmits data to one or more content servers (e.g., server 130) for further processing and/or transmission to client devices (e.g., user device 110).

For example, user device 510 may execute code comprising UA 529 for live transmission of captured media, such as a standalone media capturing and transmission application or a browser-based media capturing and transmission applet configured to run in an Internet browser. As one possible exemplary use scenario, a user may generate a live video stream and wish to deliver a high quality version of that stream to a server (e.g., for redistribution to receivers, for storage, etc.). User device 510 of embodiments may thus execute code comprising UA 529 for accessing (e.g., content stored in content file 525, content generated live by user device 510, etc.) and transmitting the content in fragments.

In operation according to embodiments, UA 529 may decide which fragments or sequences of fragments of a content file to transmit at various points in time during a streaming content session. Alternatively, logic of a receiving device (e.g., server 130 and/or user device 110) may decide which fragments or sequences of fragments of a content file are to be transmitted at various points in time during a streaming content session, and thus may provide signaling to UA 529 regarding desired fragments of content.

TA 520 is adapted according to the concepts herein to provide enhanced delivery of fragments or sequences of fragments of desired content (e.g., the aforementioned content fragments as may be used in providing video streaming, file download, web-based applications, general web pages, etc.). In providing the foregoing enhanced fragment delivery functionality, TA 520 of the embodiments herein comprises architectural components and protocols as described herein. For example, TA 520 of the embodiment illustrated in FIG. 5 comprises Request Manager (RM) 521 and Connection Manager (CM) 522 which cooperate to provide various enhanced fragment delivery functionality, as described further below.

It should be appreciated that in such user device content transmission embodiments, the aforementioned functionalities of the Transport Accelerator are reversed, whereby UA 529 provides fragments to RM 521 and RM 521 provides fragments (or chunks thereof) to CM 522. In a user device content transmission implementation of a multiple Connection Manager configuration (e.g., a CM-smHTTP configuration using a HTTP based protocol or a CM-smmTCP configuration using a proprietary protocol, based on a large number of TCP connections, using multiple HTTP connections), UA 529 may provide fragments to RM 521 and RM 521, interfaced concurrently with the multiple CMs, may provide fragments (or chunks thereof) to one or more CMs. Such multiple Connection Manager configurations may be utilized, for example, to provide implementations where there is a CM for each outgoing interface, a CM for each intermediary device, etc. For example, RM 521 of some embodiments may interface with more than one CM, similar to the configuration shown in the embodiment of FIG. 1B. Such CMs may support a different network interface (e.g., a CM may have a local interface to an on-device cache, a CM may use HTTP/TCP connections to a WiFi network interface, and a CM may use HTTP/TCP connections to a 4G/LTE network interface, etc.). Additionally or alternatively, such CMs may provide network interfaces which are similar in nature (e.g. different WiFi links). In operation according to embodiments, multiple such interfaces may be utilized (e.g., in parallel) for uplink traffic acceleration according to the concepts herein.

TA 520 of embodiments is adapted to allow a generic or legacy UA (i.e., a UA which has not been predesigned to interact with the TA) that only supports a standard interface, such as a HTTP 1.1 interface implementing standardized TCP transmission protocols, for transmitting fragments to nevertheless benefit from using the TA. Additionally or alternatively, TA 520 of embodiments provides an enhanced interface to facilitate UAs that are designed to take advantage of the functionality of the enhanced interface are provided further benefits. It should be appreciated that, although UA 529 and TA 520 of the embodiment illustrated in FIG. 5 are shown hosted on a same user device, UA 529 may not be on the same device as TA 520, according to embodiments herein.

In addition to the aforementioned code segments forming applications, operating systems, files, electronic documents, content, etc., memory 512 may include or otherwise provide various registers, buffers, and storage cells used by functional block so user device 510. For example, memory 512 may comprise a playback transmission buffer, such as may provide a first-in/first-out (FIFO) memory for spooling data of fragments for streaming to server 130 and/or user device 110.

Processor 511 of embodiments can be any general purpose or special purpose processor capable of executing instructions to control the operation and functionality of user device 510. Although shown as a single element, processor 511 may comprise multiple processors, or a distributed processing architecture.

I/O element 513 can include and/or be coupled to various input/output components. For example, I/O element 513 may include and/or be coupled to a display, a speaker, a microphone, a keypad, a pointing device, a touch-sensitive screen, user interface control elements, and any other devices or systems that allow a user to provide input commands and receive outputs from user device 510. Any or all such components may be utilized to provide a user interface of user device 510. Additionally or alternatively, I/O element 513 may include and/or be coupled to a disk controller, a NIC, a RF transceiver, and any other devices or systems that facilitate input and/or output functionality of user device 510.

In operation to stream or otherwise transmit content according to embodiments, user device 510 communicates with server 130 via network 150, using links 551 and 152, and/or with user device 110 via network 150, using links 551 and 151, to transfer content data (e.g., as the aforementioned fragments) which, when rendered, provide playback of the content. Accordingly, UA 529 may comprise a content generation and/or transfer application executed by processor 511 to provide content transmission by user device 510.

In such user device content transmission embodiments, a general approach similar to that described above with respect to a user device receiving transferred content can be used, although the flow of data is reversed. Accordingly, there may be a stream generator (e.g., UA 529) sending data to a Request Manager (e.g., RM 521), operating in the reverse to previously described, which subdivides the stream to smaller chunk units, and potentially FEC encodes it. The RM may then send those smaller chunks to a Connection Manager (e.g., CM 522), operating in the reverse to previously described, which does an inverse multiplexing of the data and transfers it on different transport connections. The CM may for example, use HTTP POST or HTTP PUT to send data to the consumer device (e.g., server 130 and/or user device 110). A Transport Accelerator of embodiments may thus operate to send data, such as over a plurality of different data links, to be stored in or otherwise consumed by a plurality of receiving devices (e.g., server 130 and/or user device 110) in addition to or in the alternative to receiving data.

Accordingly, user device 510 of FIG. 5 shown in communication with server 130 via network 150 may operate to transfer various content generated and/or stored by user device 510 (e.g., multimedia content generated by using a video and audio capturing functionality of user device 510 and stored in memory 512 as content file 525) to server 130 in accordance with the concepts of the present disclosure. UA 529 of such an embodiment may thus be operable to access and transfer content (e.g., content of content file 525) to one or more servers, such as server 130 (e.g., the content being used by server 130 to generate one or more of content files 141-143). It may be desirable, for example, to make available to receivers for viewing, either immediately, with a short time delay, or for later consumption, user generated or professionally generated video content captured in the field by an end user device.

As an example, a bicycle racer during a bicycle race may have a video camera enabled and LTE enabled device embedded into his helmet, and a multitude of viewers in their homes may desire to watch the bicycle race in real-time (or as near real-time as possible) from the point of view of this racer. Generally, uplink bandwidth capacities in networks is not as high as downlink capacities (e.g., in wired or wireless networks the uplink bandwidth capacity of the network for each individual device may be a small fraction of the downlink bandwidth capacity of the network). Furthermore, relevant network metrics on the uplink, such as RTT and packet loss rates, may be more severe on uplinks than downlinks in such networks. For the type of application described above, there is a desire to provide as high quality video stream as possible for viewing, which can be challenging using the uplink of the network from a device to provide a high quality video stream for viewing by other end users.

In the use case described above, there are many different deployment options that provide different sets of benefits. For example, the data upload of the stream generated from the video camera to servers within the network may use only the LTE connection from the racer's device. In this case, UA 529 may comprise the application that captures the video stream from the camera and provides the video fragments to TA 520 for transmission, and RM 521 and CM 522 create and transmit the chunks of data to one or more servers such as server 130.

As another example, the data upload of the stream generated from the video camera to servers within the network may use multiple devices. For example, the bicycle racers device may also be WiFi enabled, and at least some of the nearby bicyclists in the race may also have devices that are LTE and WiFi enabled. In this case, UA 529 may comprise the application that captures the video stream from the camera and provides the video fragments to TA 520 for transmission, and RM 521 generates the chunks of data from the video fragments and provides the chunks to the one or more CMs within TA 520 (e.g., one such CM for each nearby bicyclist device), and each such CM provides the chunks to a corresponding CM within a nearby bicyclist device via a WiFi connection. The CM within the nearby bicyclist device may thus accept the chunks of data provided to it and send such chunks to server 130 over the LTE interface. In this example, TA 520 may also send at least some of the chunks directly from TA 520 over the LTE network.

It should be appreciated that there are many deployment scenarios for servers or devices that receive chunks and reconstruct the fragments generated by UA 529. As one example, the receiving and regenerating device can be a server that directly reconstructs the fragments for playback based on received chunks. This deployment scenario may be appropriate where for example a reporter is sent into the field equipped with a video camera connected to a backpack full of devices (e.g., 3G or 4G/LTE or WiFi or satellite communications enabled devices) and the reporter is shooting live video that is to be sent back to a broadcast station wherein the video will then be made available to a viewing audience via other means (e.g., an IPTV service, an over-the-top HTTP streaming service, via satellite broadcast transmission, etc.). In this case UA 529 may be incorporated into one of the devices in the backpack, and the video is streamed from the backpack, potentially using multiple devices in the backpack connected to different carriers, to be delivered to a server within a broadcast station where the video fragments are to be reconstructed and made available for viewing. In this deployment scenario, server 130 may be adapted to receive the chunks of data for the fragments and reconstruct the fragments.

Figure 6:
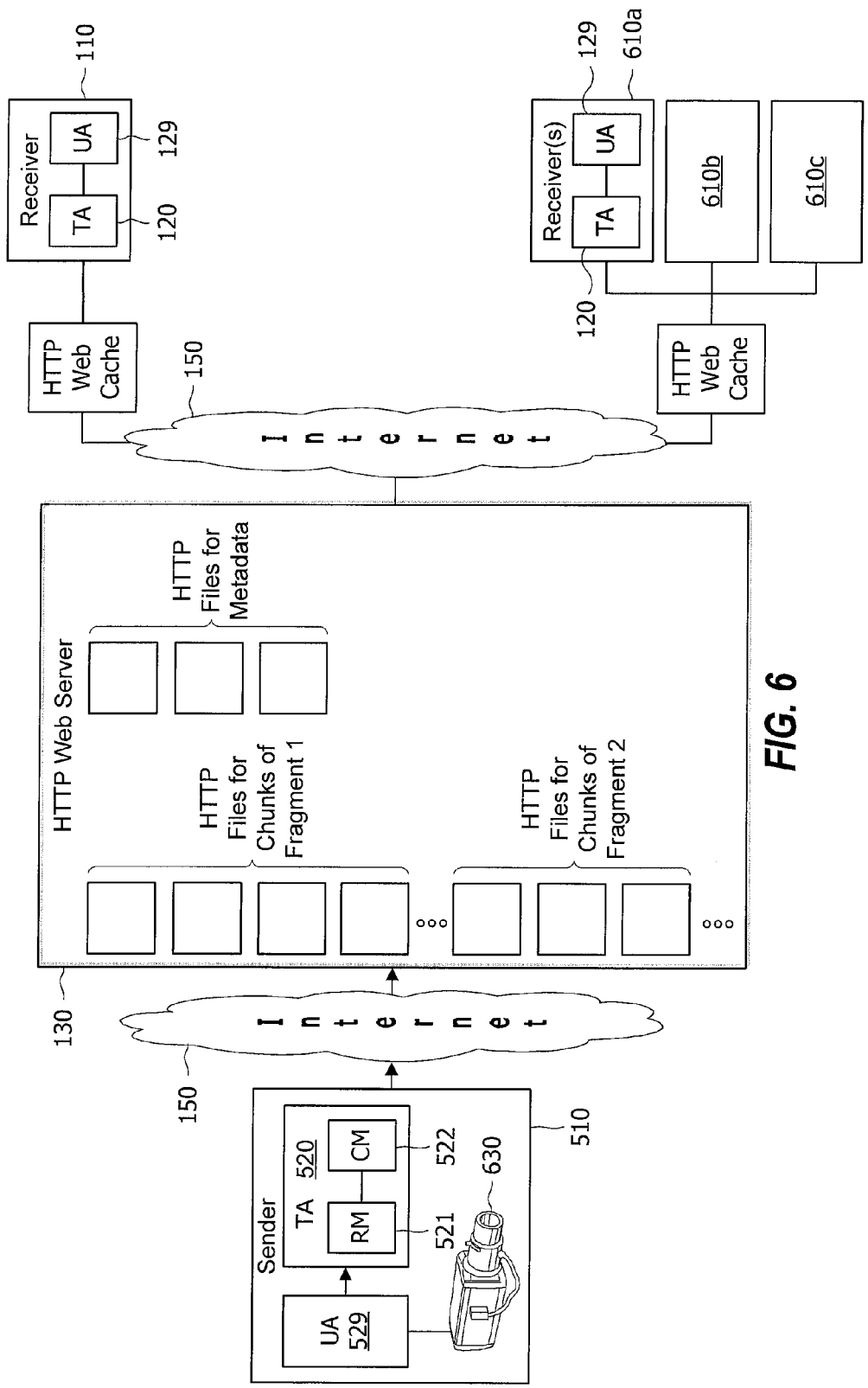
FIG. 6 shows a user device transmission implementation of a Transport Accelerator wherein a server receives content and provides the content to other user devices according to embodiments of the present disclosure.

As another example of a deployment scenario for servers or devices that receive chunks and reconstruct the fragments generated by UA 529, the receiving servers can be standard HTTP web servers that receive the chunks of data sent from TA 520. In this example, the server or servers (e.g., server 130) directly receives and stores the chunks of data sent from TA 520. The server may store, or cache, the chunks as HTTP files, and thus each chunk is addressable via a URL, URI or URN. FIG. 6 illustrates such an embodiment, wherein user device 510 is operable to transmit content captured/generated by video camera 630.

In the embodiment illustrated in FIG. 6, TA 520 generates a metadata file, or a sequence of metadata files, wherein such a metadata file comprises information about the chunks and their relationship to the fragments. For example, a metadata file of embodiments provides the URL, URI or URN of one or more chunks, provides the information about how each chunk was generated from its associated fragment (e.g., if the chunk comprises consecutive bytes of the fragment, then the byte range of the fragment carried by the chunk might be provided), and provides identifying information for each chunk about from which fragment it was generated. In order to reduce the size of metadata files and to provide higher resiliency, templating methods may be used to provide some or part of this information within metadata files. The metadata files themselves can also be provided as HTTP files, and thus each metadata file may be addressable via a URL, URI or URN. In accordance with embodiments, one or more metadata files may be associated with content (e.g., there may be a metadata file for all chunks associated with each individual fragment, there may be a metadata file that covers a fixed duration of the stream, and/or there may be one metadata file for the entire content). Information about chunks may be partitioned into metadata files. Additionally or alternatively, information about at least some chunks may be carried in more than one metadata file. The aforementioned templating methods may be used to provide some or part of the information about metadata files (e.g., templating methods may be used to derive the URLs of a related set of metadata files).

Continuing with the above deployment example, TA 520 can send (in addition to the chunks of content) the metadata files to server 130 for storage. For example, in the case where the metadata files are small enough, they may be sent as a file without RM 521 partitioning them further into chunks. Thus, server 130 stores the metadata files and the associated chunks of content, wherein the metadata files and the chunks are HTTP files that are available to other receivers for download. A receiving device (e.g., any or all of user devices 110 and 610a-610c) that wants to reconstruct the fragments (e.g., for playback of a video stream) can download the appropriate metadata files at the appropriate points in time using HTTP. In operation, the receiving devices may download the appropriate chunks, (e.g., based on the mapping information provided in the metadata files), reconstruct the fragments using an instance of TA 120 operable as a receiving Transport Accelerator as described above, and provide the reconstructed fragments to an associated UA 129 for playback. In this embodiment, TA 520 that is used to send the content, and TA 120 that is used to receive the content, are embedded in the device that generates the content and the devices that consume the content, respectively. The UA that generates the content and the corresponding UA that receives and plays back the content can be unmodified applications that do not have to embody any of the TA functionality. Likewise, the servers to which the chunks of content are sent and from which the chunks of content are retrieved can be unmodified HTTP web servers.

Figure 7:
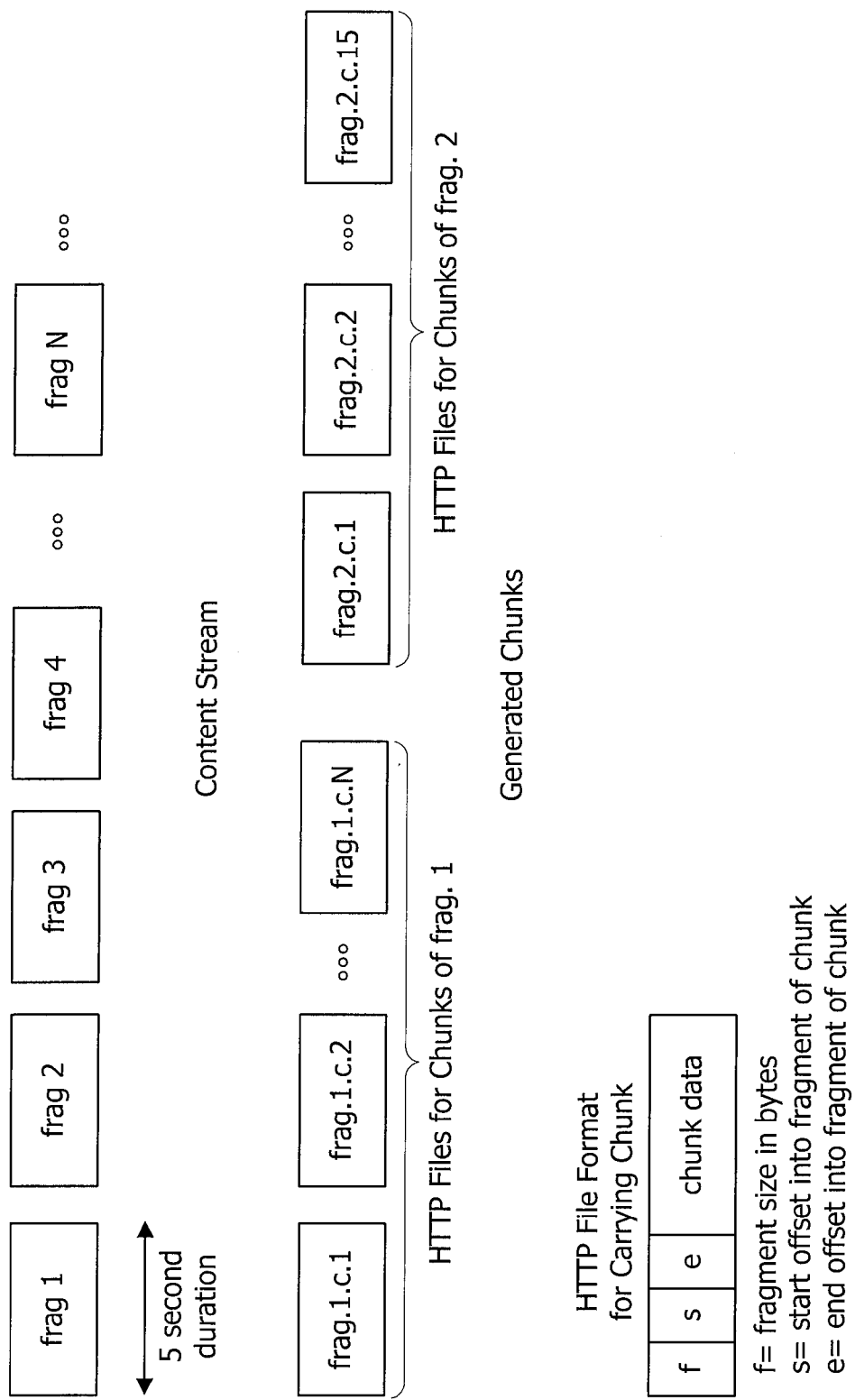
FIG. 7 shows a user device transmission Transport Accelerator implementation wherein content is transmitted without the use of metadata files according to embodiments of the present disclosure.

It should be appreciated that there are many variants of the foregoing embodiments. For example, all of the information in the metadata files may be inferred by the receiving TA (e.g., where the URLs, URIs, or URNs for the chunks are based on templating that is based on the fragment URLs, URIs, or URNs and where the chunk sizes are fixed, or the chunk information such as a byte range is included as a header within the HTTP accessible version of the chunk). The embodiment illustrated in FIG. 7, for example, does not use the above described metadata files. The HTTP chunk files (which may contain some header information prepended that describes how the chunk was generated from the fragment) can be accessed using HTTP by TA 120 that is used to receive the content within devices that download and playback the content. In this embodiment, receiving UA 129 can determine, for example from a base URL for the content corresponding to the stream of fragments, URI or URN and the template pattern for generating fragment URLs, URIs, or URNs, the URL, URI or URN of the fragment UA 129 should request from TA 120. Similarly, RM 121 of TA 120 can determine, based on the URL, URI or URN for a fragment provided by UA 129 and the template pattern for generating chunk URLs, URIs, or URNs from a fragment URL, URI or URN, the URLs, URIs, or URNs of the chunks that can be requested to allow RM 121 to reconstruct the fragment. Furthermore, RM 121 can determine from the header data of each chunk response the fragment size and the start and end bytes of the chunk within the fragment. Thus, RM 121 can reassemble the fragment from the received chunks for the fragment and provide the response to UA 129. Thus, UA 129 and TA 120 can request and recover the stream of fragments without any additional metadata beyond for example the base URL, URI or URN for the content corresponding to the stream of fragments and the predictable patterns of the fragment and chunk URLs, URIs or URNs.

In operation according to embodiments, encryption can be employed to provide capabilities to obscure or completely eliminate the possibility of determining the relationship between which UAs are uploading content for consumption and which UAs are downloading content for viewing. For example an encryption key E may be privately shared between a sending user device 510 and a receiving user device 110. RM 521 of user device 510 may be provided with an encryption key E that is used to produce an encrypted URL of the URL for the chunk as generated from the template pattern as describe above, for example the encryption key E is applied to the path and/or fragment portions of the original URL generated from the template pattern and these encryptions are substituted into the corresponding fields of the original URL to produce the encrypted URL. Thus, RM 521 may provide the encrypted URL for a chunk to CM 522 when the chunk is provided to CM 522, and thus the encrypted URL is used as the universal resource locator when the chunk is stored in the servers that is the encryption of the URL generated from the template pattern as described above. Similarly, RM 121 of user device 110 may be provided with the same encryption key E. Thus, when RM 121 determines a chunk to request, it can generate the original URL for that chunk based on the template pattern and the fragment from which the chunk was generated, and then can generate the encrypted URL of the chunk by applying the key E to produce the encryption of the path and/or fragment portions of the original URL and then form the encrypted URL from this. In addition, the data contained in the chunks may also be encrypted by a sender and decrypted by a receiver using a common shared secret key E. Thus, any potential adversary that does not have the key E will not be able to determine the original URLs of the chunks or fragments, nor be able to determine the contents of the chunks stored on the servers.

It can be appreciated from the foregoing that, although the flow of data in a user device transmission implementation is the opposite from other embodiments described above, the Transport Accelerator architecture as well as the concepts regarding the methods, protocols, signaling, and algorithms are very similar and thus are readily applied to such user device transmission embodiments. For example, RM 521 can signal to UA 529 when the RM is ready to receive the next fragment, and the UA can decide which fragment to supply to the RM based on a number of factors (e.g., the current upload rate of the content from the RM through the CMs to the network interfaces). The UA can choose to respond to or ignore the indications from the RM regarding when it is a good time to provide the next fragment to the RM for transmission. For example, if UA 529 is a streaming application, such as a video generating agent that can generate video at different bit-rates and quality depending on the outgoing aggregate rate capacity across all the CMs (e.g., a DASH video generating agent), then UA decisions about what quality and bit-rate video to encode and provide for the next fragment may be based upon on the timing of when the RM indicates to the UA that it is ready for the next fragment (possibly together with other information, such as regarding the current outgoing data delivery rate, as may be provided to the UA by the RM and/or CMs).

Similarly, CM 522 can signal to RM 521 when it is a good time to provide a next chunk request, such as based on when the CM is ready to start processing and sending such a chunk request over its interface. For example, if a CM-mHTTP configuration is provided with respect to the CM, the CM may decide when to start sending additional data within a particular open-ended HTTP request over a TCP connection to the receiving device (e.g., server 130 using a chunk delivery method) based on when that TCP connection is close to finished delivering a previous chunk request. In such an embodiment, signaling may be provided to indicate within the delivered stream of data what data is being delivered. For example, CM 522 configured for CM-mHTTP operation may operate to send data over 8 TCP connections using chunk HTTP-delivery, whereby the CM maps a data chunk provided by the RM to an HTTP chunk delivery to a first TCP-connection that is available to send more data. However, the next chunk provided by the RM may be delivered via a second TCP-connection that is different than the first. Thus, additional information that describes which data is being delivered within each chunk may be provided in the delivery, so that the receiving device can re-aggregate the data chunks received over the various TCP connections for a fragment and reconstruct the fragment from these received data chunks.

Further, concepts of the foregoing proprietary protocol CM configuration CM-rUDP, wherein the CM uses a proprietary User Datagram Protocol (UDP) protocol for receiving content, may be applied to embodiments wherein user device 510 implements a proprietary protocol CM configuration for sending content (referred to herein as CM-sUDP). CM-sUDP of embodiments uses a proprietary UDP protocol, but in contrast to variants discussed above, the server operates to determine which data to send, rather than the UA or RM.

Figure 8:
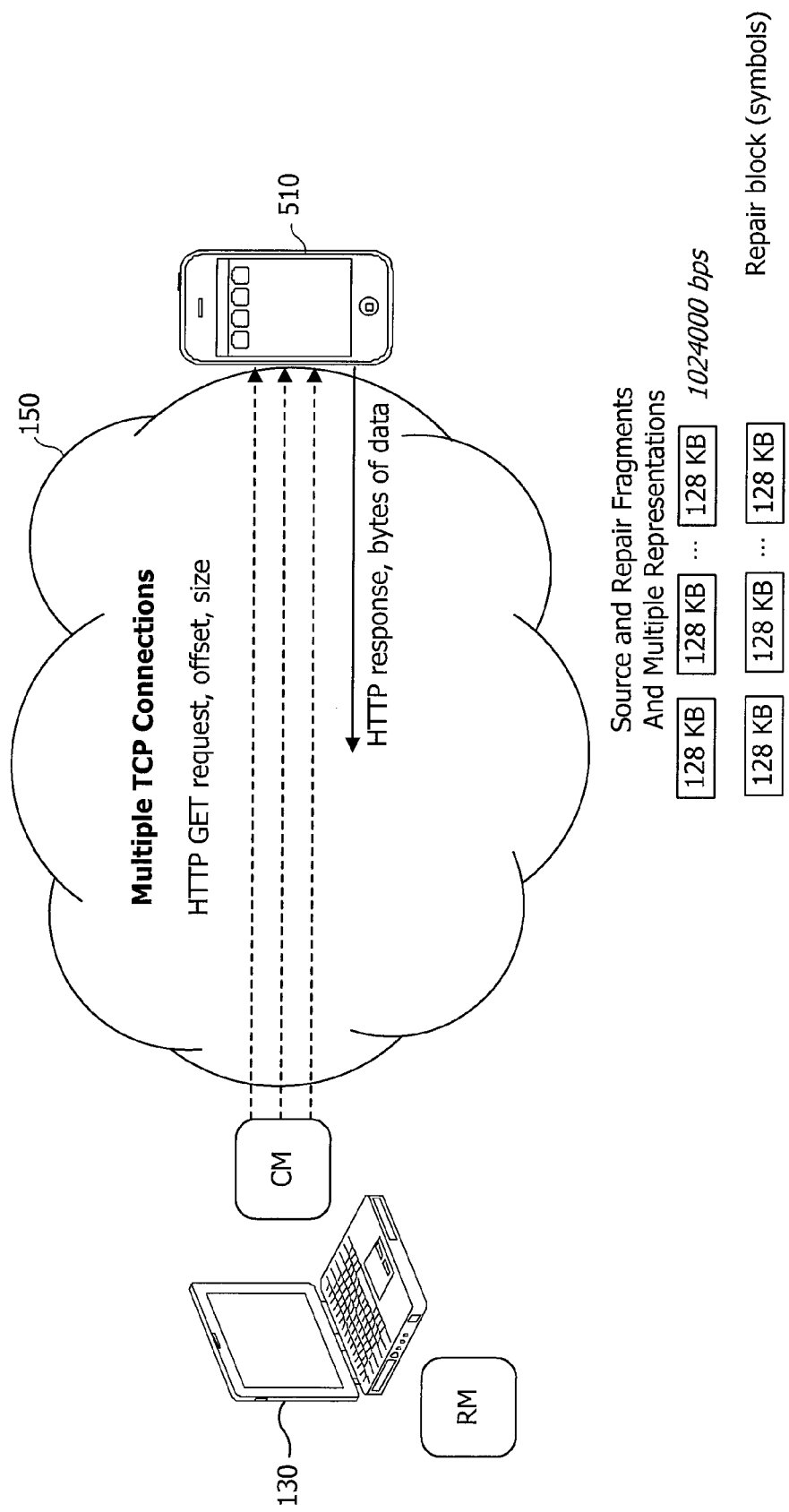
FIGS. 8-10 show operation of a Transport Accelerator architecture wherein a User Device performs as a content device providing content to a Server operable as a consumer device.
Figure 9:
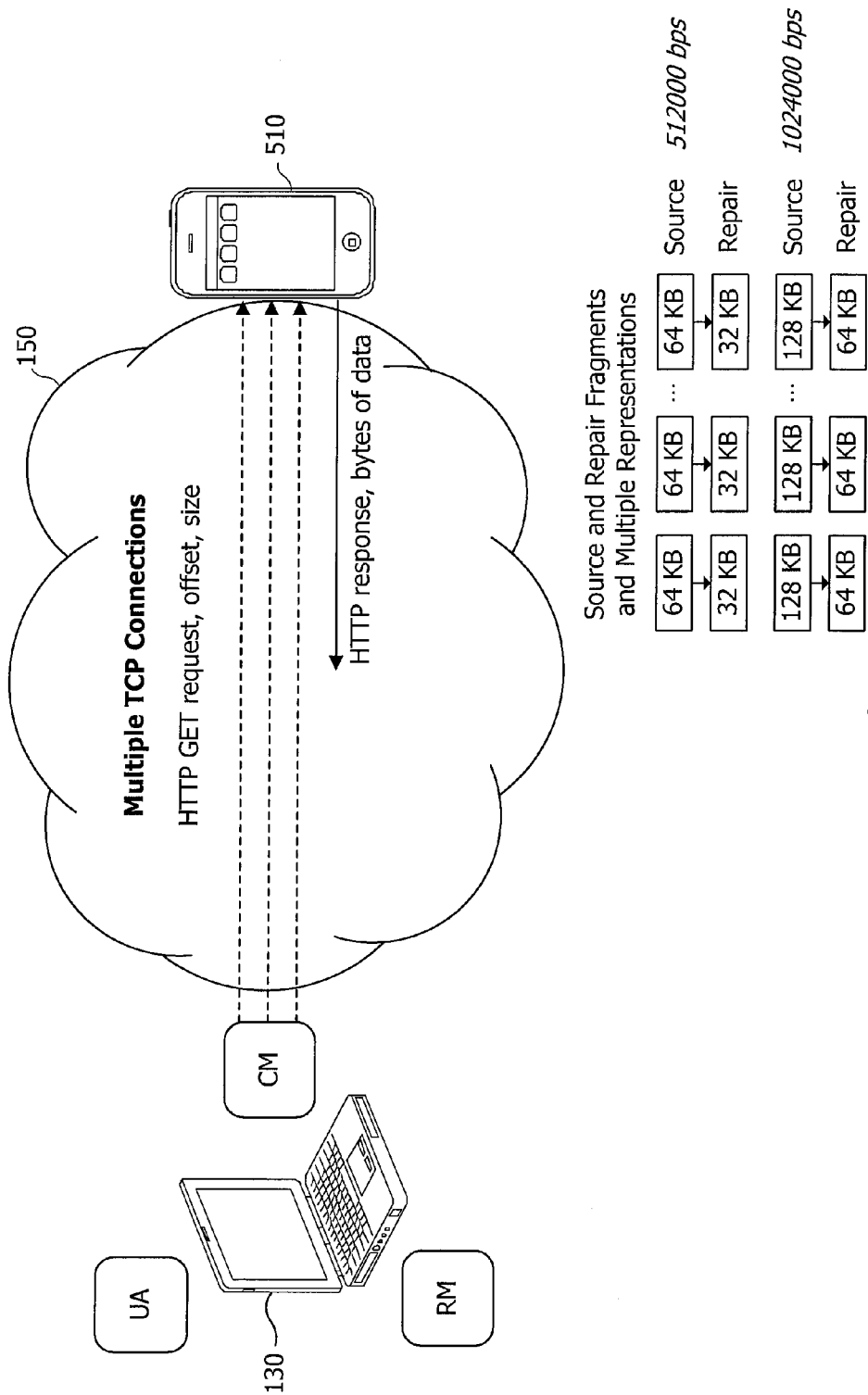
Figure 10:
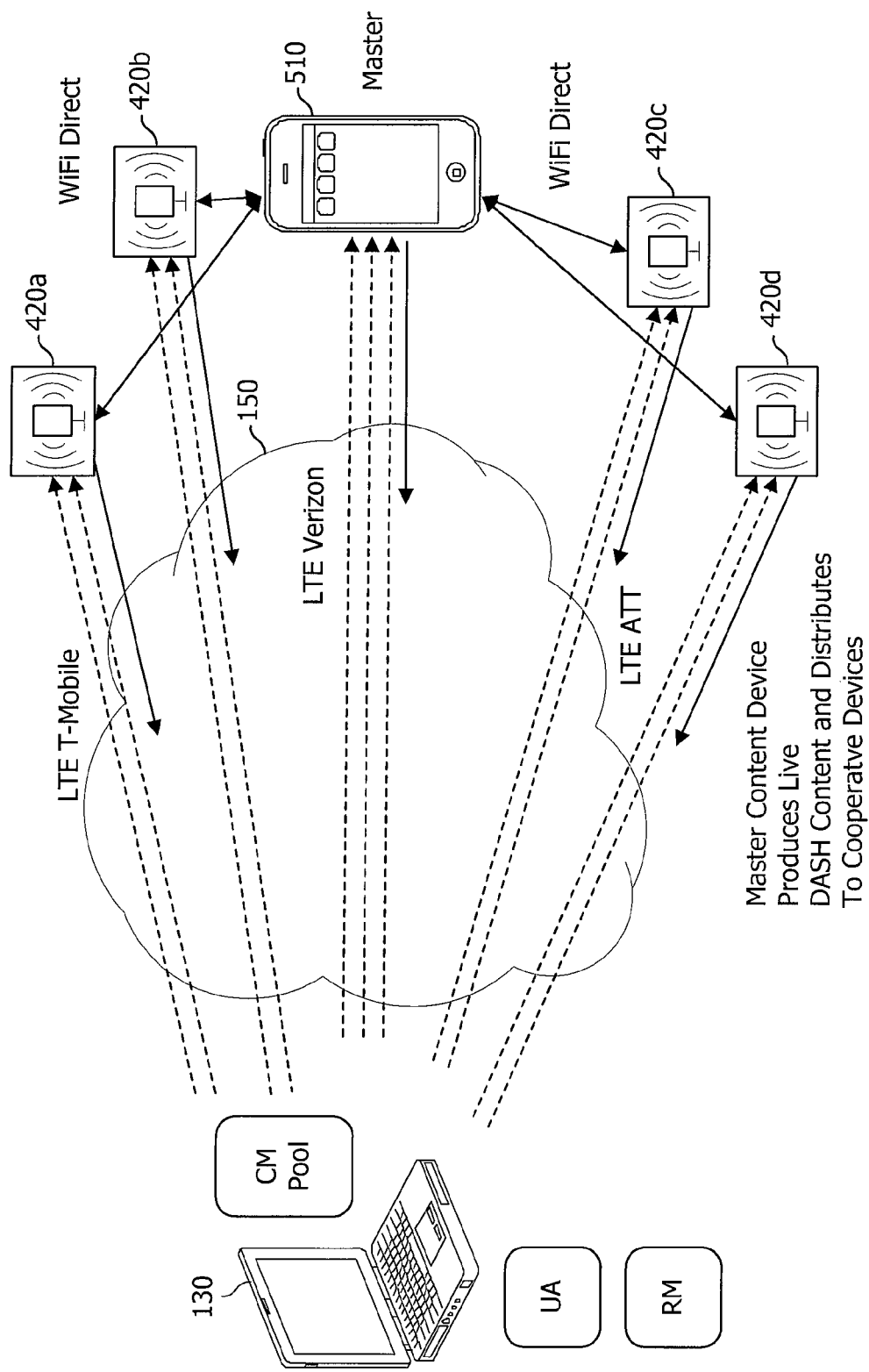

The scenarios represented in FIGS. 8-10 illustrate operation of embodiments of systems utilizing a Transport Accelerator according to the concepts herein to provide enhanced transfer of fragments or sequences of fragments of content from a user device. In particular, FIG. 8 illustrates operation of a Transport Accelerator architecture in general wherein user device 510 performs as a "content device" providing content to server 130 operable as a "consumer device", such as for uploading of content to the server. FIG. 9 illustrates operation of a Transport Accelerator architecture in a more specific scenario wherein the content is DASH formatted and user device 510 (e.g., a content device) provides the content to server 130 (e.g., a consumer device). FIG. 10 illustrates a more advanced use case, wherein TA proxies 420a-420d (e.g., as may be in communication with user device 510 using direct connections such as WiFi, WiFi direct, Bluetooth, etc.) are used in cooperation user device 510 (e.g., a content device) to facilitate transfer of content through their connections with server 130 (e.g., a consumer device). It should be appreciated that, although the embodiment illustrated in FIG. 10 shows TA proxies 420a-420d providing network interfaces which are similar in nature (e.g. different LTE links), such TA proxies may support a plurality of different network interfaces (e.g., WiFi, 3G, 4G/LTE, etc.). In FIGS. 8-10, although shown as server 130 pulling data from user device 510 using HTTP GET, as described above an alternative is for user device 510 to push data to server 130 using HTTP POST or PUT, for example.

As can be appreciated from the foregoing, the broad architecture of a Transport Accelerator operating in reverse to provide transfer of content from a user device may be similar to the Transport Accelerator operable for enhanced delivery of content to the user device. The functioning of individual components may, however, differ in some respects according to embodiments herein. Detail with respect to exemplary implementations of a Transport Accelerator operating to provide enhanced transmission of content from a user device is provided below.

In a CM-smHTTP configuration using multiple HTTP connections, user device 510 may operate to upload data over several HTTP connections (e.g., using HTTP POST or HTTP PUT). Accordingly, the CM(s) may operate to decide which connection the next chunk of data is to be posted or put to, and signal to the RM when it is ready to receive the next chunk to be posted or put.

In operation according to embodiments, chunks are posted or put on a connection only when they fit the remaining space of the TCP send buffer. Such operation ensures that the send( ) system call will not block for any significant amount of time. If no such connection is available, the CM managing that connection may queue the POST or PUT (e.g., in an internal processing queue of the CM) or the CM may refuse to accept requests in such a case. Alternatively, the CM may block in such a case, such as until the POST can be executed.

Embodiments of a CM may operate to determine whether a TCP connection send buffer has enough space to accommodate a POST using the following technique, for example. In a Linux environment the SIOCOUTQ ioctl returns the amount of space occupied in the send buffer and the SO_SNDBUF socket option returns the send buffer size. Accordingly, the available space can be estimated by subtracting the value returned from the SIOCOUTQ ioctl from the SO_SNDBUF socket option.

A threshold parameter, similar to Thresh discussed above, may be utilized in a connection fairness implementation that controls the amount of data transmitted but not yet acknowledged as delivered over each connection, according to embodiments. The value of this threshold parameter, which may be controlled by the CM, may be used to decide when another chunk of data can be posted or put on a connection. An analog of the DCR parameter discussed above, referred to herein as sDCR (e.g., sender DCR), may be utilized with respect to the threshold parameter for user device transmission implementations.

To aid in understanding determining the aforementioned sDCR parameter as may be utilized with respect to posting content for transmission by a user device according to embodiments, the following explanation will reference a single connection example. It should be appreciated, however, that the concepts herein apply to multiple connection implementations. In operation according to embodiments, logic of TA 120 maintains an array A of tuples (e.g., header_acked, size_remaining), where header_acked is a Boolean variable, and size_remaining is an integer. When a new request to post or put content is written to the network socket, an entry (e.g., false, S) is appended to the end of A, where S is the size of the POST, including HTTP request header.

At the time of the first POST, embodiments operate to set Tlast to the current system time and periodically execute the following procedure. Each execution will potentially allow the application to update its rate information with another sampled data point. Since the procedure of embodiments aims to discount for initial request RTTs, the sampling periodicity may be chosen to be significantly less than an RTT (e.g., on an order of magnitude or so lower).
n:=sum(A.size_remaining)−ioctl(fd, SIOCOUTQ)
\# sum(A.size_remaining) denotes the sum of all size_remaining entries in the array A
\# n is the number of bytes acknowledged (known received by receiver) since the last
\# time we checked. We always have n>=0.

```
T_delta, Z_delta = 0
if n > 0:
    Z_delta = n
    do_keep = A[0].header_acked
    while n > 0:
        A[0].header_acked = true
        If n >= A[0].size_remaining
            n = n − A[0].size_remaining
            remove A[0] from the array
        else:
            A[0].size_remaining = A[0].size_remaining − n
            n = 0
    tmp = current_time( )
If do_keep:
    T_delta = tmp − Tlast
else:
    T_delta = 0
    Z_delta = 0
Tlast = tmp
```

After execution of the foregoing procedure, T_delta contains a time delta, and Z_delta a delta in the amount of bytes delivered. A cumulative Z and T value may be computed by adding those values to the previous cumulative Z and T values. Z/T will then be the overall sDCR, and windowed estimates can be obtained using the usual techniques. For example, if the sDCR is to be computed over a window of 2 seconds, T and Z of embodiments may be accumulated over 2 seconds (by adding up the obtained T_delta and Z_delta values), and then sDCR=Z/T would be the desired estimate.

In addition to the aforementioned sDCR parameter discussed above, embodiments further utilize an analog to the DPR parameter, referred to herein as sDPR (e.g., sender DPR), may be utilized with respect to the threshold parameter for user device transmission implementations. The sDPR parameter may be determined using similar techniques to those discussed above with respect to sDCR. For example, the same approach as for sDCR could be used, but only ignore the initial response for requests that were queued on a previously idle connection, instead of discarding it for all requests. It should be appreciated that this could be done in the above procedure (e.g., by setting the header_acked field to true for all new requests added to the queue A whenever A was nonempty already before the request was added).

Having determined values for sDCR and sDPR, embodiments may operate to determine the aforementioned threshold parameter, Thresh, used with respect to user device content transmission. For example, a Thresh value may be determined using the same algorithms described with respect to user device content receiving implementations, except that the quantities sDCR and sDPR are used instead of DCR and DPR.

In operation according to embodiments, the CM of a CM-smHTTP configuration may accept a new request to post or put whenever the sum of buffer occupancies (as determined with SIOCOUTQ) drops below the value of the threshold parameter, Thresh. The new chunk request may thus be scheduled onto the TCP connection with the lowest amount of unacknowledged data.

In order to provide optimized operation for a CM-smHTTP configuration, the cumulative sender buffer of embodiments is preferably set sufficiently large. For example, the cumulative sender buffer may be set so that there is at least one connection able to accommodate the next chunk POST whenever the overall occupancy drops below Thresh. This can be guaranteed by choosing the send buffer size of each TCP connection to be at least schunk+Thresh/N, where schunk is the chunk size including header overhead, and N is the number of connections used (it being appreciated that Thresh/N in the foregoing is an upper bound on the average occupancy of the send queues).

In a CM-smmTCP configuration, user device 510 may operate to upload data using a proprietary protocol, based on a large number of TCP connections, using multiple HTTP connections. For example, when CM 522 of a CM-smmTCP configuration receives a packet to send, it may select a connection which does not have any outstanding unacknowledged data, and send the packet on that connection (perhaps with meta-data, such as payload length information), according to embodiments. Such operation essentially performs a form of inverse multiplexing at the sender. The receiver on the other end may thus wait for data on all the TCP connections, and deliver the received packets in arbitrary order to the application. It can be appreciated that, because of the large number of connections opened according to embodiments, a CM-smmTCP implementation is most practical when both end points are one-to-one (e.g., when a single source sends data to a single consumer, such as a data processing center).

A goal of operation according to a CM-smmTCP configuration of embodiments is to provide behavior like UDP operation from the software point of view. Such embodiments may, for example, provide a replacement for UDP in many systems whose design relies on a unicast UDP transport model. An advantage of such CM-smmTCP configuration operation over a true UDP implementation is that the data communication is based on TCP, and therefore may be used even in the presence of NAT and/or firewalls. An advantage of such CM-smmTCP configuration operation over a traditional TCP implementation is that the data communication does not have many of the drawbacks of TCP for real-time application. For example, a packet loss on the network results in the corresponding packet arriving with a (potentially large) delay with CM-smmTCP, but it does not affect the timely delivery of other datagrams. In contrast, a traditional TCP implementation enforces in order delivery, and thus a packet loss causes a delay for a whole bandwidth-delay-product of data (e.g., several seconds worth of transmission). As a further example, the throughput provided by operation of a CM-smmTCP configuration is not strongly affected by packet loss rate and network congestion. Thus, the sender has more freedom in implementing a suitable congestion control mechanism. For example, if a live video stream is transmitted using a CM-smmTCP configuration of embodiments, the application may operate to react to network congestion by adjusting the video encoding rate.

Operation of a CM-smmTCP implementation may comprise one side of a content device/consumer device pair (e.g., user device 510 operable as the content sender) opening a large number, K, of TCP connections to the other side (e.g., server 130 operable as the content consumer). In selecting the number of connections, K, according to embodiments, let t be the round trip time, let P be typical packet size (e.g., P<MSS), and let R be the maximum target transfer rate. The number of connections, K, may be chosen to be at least equal to $R*t/P$, according to embodiments. It may, however, be desirable to select a larger value of K, such as $2*(R*t/P)$. Choosing a larger value according to embodiments will ensure that the sender will not be constrained by short term rate fluctuations (either of the stream it is attempting to transfer, or of the channel). In addition, the $R*t/P$ lower bound is loose when there is some packet loss. A typical number of TCP connections, K, may be 256, for example.

It can be appreciated that a challenge associated with the use of a large number of connections, K, according to a CM-smmTCP configuration is that the memory use associated with the send and receive buffers may be large. In standard TCP, such buffers have a size of the order of dozens of Kilobytes up to a few Megabytes. Where the number of connections, K, is large, such buffer memory use may result in a significant amount of wasted memory. However, in CM-smmTCP implementations of embodiments there is only one packet in flight for each connection. Therefore, each end of a CM-smmTCP implementation may reduce its send and receive buffer sizes to the needed size of 1 packet (e.g., by using the SO_RCVBUF and SO_SNDBUF socket options). Where the foregoing buffer sizes are used, and K is chosen as above, the aggregate buffer size will be on the order of a bandwidth-delay product, and thus optimal according to embodiments.

Another challenge associated with the use of a large number of connections according to a CM-smmTCP configuration is that the select( ) and poll( ) system calls usually used for waiting on sockets scale linearly with the number of sockets being watched. Such scaling is generally not efficient where there are hundreds or even thousands of connections to watch. Similar challenges occur, however, in other software implementations, such as web servers and browsers. In those situations, the challenge is often addressed by using more efficient, but less portable, interfaces such as epoll or kqueue. Similar techniques may be implemented in association with a CM-smmTCP configuration of embodiments herein.

It should be appreciated that some TCP implementations delay sending out data on a socket to avoid excessive header overhead by coalescing small data segments to larger segments, such as through implementation of Nagle's algorithm. Such delay is typically undesirable in operation of embodiments herein, such as where an operational goal is to send out each packet as fast as possible. Accordingly, embodiments may implement content sending techniques adapted to ensure that chunks are sent timely, such as by TA 520 operating to set the TCP_NODELAY socket option.

Some TCP implementations operate to send ACKs with a delay in order to reduce network traffic. Such operation is generally not ideal with respect to operation of a CM-smmTCP configuration, since the sender (e.g., user device 510) of embodiments can only use connections with no unacknowledged data in flight. To avoid underutilization of bandwidth associated with such delayed ACKs, the receiver (e.g., server 130) may be configured to disable delayed ACKs. However, a more portable and elegant solution implemented according to embodiments comprises the receiver sending a "confirmation byte" for each packet received on any connection (the receiver also preferably uses TCPNODELAY). The sender may thus track which connections have an outstanding confirmation byte, and avoid sending on those connections. Although the use of such confirmation bytes results in some reverse traffic, the reverse traffic is not significantly more than a solution with delayed acknowledgements disabled, since the confirmation byte and the ACK can be sent in the same packet.

From the foregoing it can be appreciated that variations, providing different tradeoffs, may be made with respect to a CM-smmTCP configuration herein. For example, a sender may allow a plurality of unacknowledged packets (e.g., at most c unacknowledged packets) on each connection, rather than allowing only one unacknowledged packet. Such embodiments would reduce the number of needed connections by a factor roughly equivalent to the number of unacknowledged packets allowed (e.g., a factor of c in the foregoing example), provided that the number of unacknowledged packets is sufficiently small. However, the reduction in connections is provided at the expense of causing a delay of approximately the number of unacknowledged packets allowed (e.g., approximately c packets) for each packet that is lost in transmission.

Although selected aspects have been illustrated and described in detail, it will be understood that various substitutions and alterations may be made therein without departing from the spirit and scope of the present invention, as defined by the following claims.

What is claimed is:

1. A method for accelerating, by a transport accelerator (TA) of a user device, transmission of content from a user agent (UA) of the user device to a remote recipient, the method comprising:
   determining, by a connection manager (CM) of the TA, a size of content chunks for subdividing fragments of content provided by the UA;
   signaling, from the CM to a request manager (RM) of the TA, the size of the content chunks;
   subdividing, by the RM, the fragments of content provided by the UA each into a plurality of content chunks;

providing, by the RM to the CM, content chunks of the plurality of content chunks for transmitting the content chunks; and transmitting, by the CM, the content chunks via a plurality of connections established between the CM and the remote recipient.

2. The method of claim 1, wherein the size of the content chunks is determined to maximize network transfer rate independent of network congestion avoidance operation of a communication protocol used in the transmitting the content chunks.

3. The method of claim 1, further comprising:
signaling, by the CM to the RM, that the CM is ready for an additional content chunk of the content chunks.

4. The method of claim 3, wherein the signaling that the CM is ready for the additional content chunk comprises:
determining that data occupancy of one or more send buffers of the user device is below a threshold parameter value.

5. The method of claim 4, wherein the threshold parameter value is determined as a function of a sender Download Chunk Rate (sDCR) parameter and a sender Download Pipeline Rate (sDPR) parameter.

6. The method of claim 3, further comprising:
signaling, by the RM to the UA, that the RM is ready for an additional content fragment for transmission.

7. The method of claim 1, further comprising:
dynamically adjusting, by the CM, a number of connections of the plurality of connections established between the CM and the remote recipient.

8. The method of claim 1, wherein the transmitting the content chunks via the plurality of connections comprises transmitting two or more content chunks in parallel via the plurality of connections.

9. The method of claim 8, wherein the plurality of connections comprise different types of network interfaces.

10. The method of claim 1, wherein the transmitting the content chunks via the plurality of connections comprises:
withholding transmission of a next content chunk via a particular connection when a content chunk packet remains unacknowledged with respect to that particular connection.

11. The method of claim 1, wherein the transmitting the content chunks via the plurality of connections comprises:
allowing transmission of a next content chunk via a particular connection when a number of unacknowledged content chunk packets with respect to that particular connection is less than or equal to a predetermined number.

12. The method of claim 11, further comprising:
scheduling the next content chunk for transmission via a connection of the plurality of connections having a lowest amount of unacknowledged content chunk packets.

13. The method of claim 1, wherein the CM comprises a CM of a plurality of CMs used in transmission of content from the user agent of the user device to the remote recipient.

14. The method of claim 13, wherein at least one CM of the plurality of CMs comprises a part of a proxy in communication with the remote recipient.

15. The method of claim 1, wherein the remote recipient comprises a content server.

16. An apparatus for accelerating, by a transport accelerator (TA) of a user device, transmission of content from a user agent (UA) of the user device to a remote recipient, the apparatus comprising:

means for determining, by a connection manager (CM) of the TA, a size of content chunks for subdividing fragments of content provided by the UA;

means for signaling, from the CM to a request manager (RM) of the TA, the size of the content chunks;

means for subdividing, by the RM, the fragments of content provided by the UA each into a plurality of content chunks;

means for providing, by the RM to the CM, content chunks of the plurality of content chunks for transmitting the content chunks; and means for transmitting, by the CM, the content chunks via a plurality of connections established between the CM and the remote recipient.

17. The apparatus of claim 16, wherein the size of the content chunks is determined to maximize network transfer rate independent of network congestion avoidance operation of a communication protocol used in transmitting the content chunks.

18. The apparatus of claim 16, further comprising:
means for signaling, by the CM to the RM, that the CM is ready for an additional content chunk of the content chunks.

19. The apparatus of claim 18, wherein the means for signaling that the CM is ready for the additional content chunk comprises:
means for determining that data occupancy of one or more send buffers of the user device is below a threshold parameter value.

20. The apparatus of claim 19, wherein the threshold parameter value is determined as a function of a sender Download Chunk Rate (sDCR) parameter and a sender Download Pipeline Rate (sDPR) parameter.

21. The apparatus of claim 18, further comprising:
means for signaling, by the RM to the UA, that the RM is ready for an additional content fragment for transmission.

22. The apparatus of claim 16, further comprising:
means for dynamically adjusting, by the CM, a number of connections of the plurality of connections established between the CM and the remote recipient.

23. The apparatus of claim 16, wherein the means for transmitting the content chunks via the plurality of connections comprises means for transmitting two or more content chunks in parallel via the plurality of connections.

24. The apparatus of claim 23, wherein the plurality of connections comprise different types of network interfaces.

25. The apparatus of claim 16, wherein the means for transmitting the content chunks via the plurality of connections comprises:
means for withholding transmission of a next content chunk via a particular connection when a content chunk packet remains unacknowledged with respect to that particular connection.

26. The apparatus of claim 16, wherein the means for transmitting the content chunks via the plurality of connections comprises:
means for allowing transmission of a next content chunk via a particular connection when a number of unacknowledged content chunk packets with respect to that particular connection is less than or equal to a predetermined number.

27. The apparatus of claim 26, further comprising:
means for scheduling the next content chunk for transmission via a connection of the plurality of connections having a lowest amount of unacknowledged content chunk packets.

28. The apparatus of claim 16, wherein the CM comprises a CM of a plurality of CMs used in transmission of content from the user agent of the user device to the remote recipient.

29. The apparatus of claim 28, wherein at least one CM of the plurality of CMs comprises a part of a proxy in communication with the remote recipient.

30. The apparatus of claim 16, wherein the remote recipient comprises a content server.

31. A computer program product for accelerating, by a transport accelerator (TA) of a user device, transmission of content from a user agent (UA) of the user device to a remote recipient, the computer program product comprising:
   a non-transitory computer-readable medium having program code recorded thereon, the program code including:
      code to determine, by a connection manager (CM) of the TA, a size of content chunks for subdividing fragments of content provided by the UA;
      code to signal, from the CM to a request manager (RM) of the TA, the size of the content chunks;
      code to subdivide, by the RM, the fragments of content provided by the UA each into a plurality of content chunks;
      code to provide, by the RM to the CM, content chunks of the plurality of content chunks for transmitting the content chunks; and
      code to transmit, by the CM, the content chunks via a plurality of connections established between the CM and the remote recipient.

32. The computer program product of claim 31, further comprising:
   code to signal, by the CM to the RM, that the CM is ready for an additional content chunk of the content chunks.

33. The computer program product of claim 32, wherein the code to signal that the CM is ready for the additional content chunk comprises:
   code to determine that data occupancy of one or more send buffers of the user device is below a threshold parameter value, wherein the threshold parameter value is determined as a function of a sender Download Chunk Rate (sDCR) parameter and a sender Download Pipeline Rate (sDPR) parameter.

34. The computer program product of claim 32, further comprising:
   code to signal, by the RM to the UA, that the RM is ready for an additional content fragment for transmission.

35. The computer program product of claim 31, further comprising:
   code to dynamically adjust, by the CM, a number of connections of the plurality of connections established between the CM and the remote recipient.

36. The computer program product of claim 31, wherein the code to transmit the content chunks via the plurality of connections comprises:
   code to withhold transmission of a next content chunk via a particular connection when a content chunk packet remains unacknowledged with respect to that particular connection; and
   code to allow transmission of a next content chunk via a particular connection when a number of unacknowledged content chunk packets with respect to that particular connection is less than or equal to a predetermined number.

37. The computer program product of claim 36, further comprising:
   code to schedule the next content chunk for transmission via a connection of the plurality of connections having a lowest amount of unacknowledged content chunk packets.

38. The computer program product of claim 31, wherein the CM comprises a CM of a plurality of CMs used in transmission of content from the user agent of the user device to the remote recipient.

39. The computer program product of claim 38, wherein at least one CM of the plurality of CMs comprises a part of a proxy in communication with the remote recipient.

40. An apparatus configured for accelerating, by a transport accelerator (TA) of a user device, transmission of content from a user agent (UA) of the user device to a remote recipient, the apparatus comprising:
   at least one processor; and
   a memory coupled to the at least one processor,
   wherein the at least one processor is configured:
      to determine, by a connection manager (CM) of the TA, a size of content chunks for subdividing fragments of content provided by the UA;
      to signal, from the CM to a request manager (RM) of the TA, the size of the content chunks;
      to subdivide, by the RM, the fragments of content provided by the UA each into a plurality of content chunks;
      to provide, by the RM to the CM, content chunks of the plurality of content chunks for transmitting the content chunks; and
      to transmit, by the CM, the content chunks via a plurality of connections established between the CM and the remote recipient.

* * * * *